(12) United States Patent
Bao

(10) Patent No.: US 12,405,966 B2
(45) Date of Patent: Sep. 2, 2025

(54) DATA PROCESSING METHOD, APPARATUS, AND SYSTEM, COMPUTER DEVICE, READABLE STORAGE MEDIUM, AND COMPUTER PROGRAM PRODUCT

(71) Applicant: Tencent Technology (Shenzhen) Company Limited, Shenzhen (CN)

(72) Inventor: Zenghui Bao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/128,144

(22) Filed: Mar. 29, 2023

(65) Prior Publication Data
US 2023/0237064 A1 Jul. 27, 2023

Related U.S. Application Data

(63) Continuation of application No. PCT/CN2022/097848, filed on Jun. 9, 2022.

(30) Foreign Application Priority Data

Jul. 8, 2021 (CN) .......................... 202110772159.5

(51) Int. Cl.
G06F 16/245 (2019.01)
G06F 7/14 (2006.01)
G06F 16/25 (2019.01)

(52) U.S. Cl.
CPC ............. *G06F 16/258* (2019.01); *G06F 7/14* (2013.01); *G06F 16/245* (2019.01)

(58) Field of Classification Search
CPC ..................... G06F 16/245; G06F 16/258
See application file for complete search history.

(56) References Cited

U.S. PATENT DOCUMENTS 11,100,051 B1 * 8/2021 Mao ...................... G06F 16/137
2009/0006648 A1 * 1/2009 Gopalakrishnan ..........................
H04L 61/2503
709/245

(Continued)

FOREIGN PATENT DOCUMENTS

CN 102291269 A 12/2011
CN 102316025 A 1/2012

(Continued)

OTHER PUBLICATIONS

Tencent Technology, WO, PCT/CN2022/097848, Sep. 7, 2022, 5 pgs.

(Continued)

*Primary Examiner* — Grace Park
(74) *Attorney, Agent, or Firm* — Morgan, Lewis & Bockius LLP

(57) ABSTRACT

A data processing method, apparatus, and system, a computer device, a readable storage medium, and a computer program product relate to the field of cloud technologies and a blockchain technology, and the method includes: receiving, by using a transceiver component, collection indicator data sent by an edge cluster; performing pre-aggregation processing on the collection indicator data to obtain pre-aggregated indicator data, and sending the pre-aggregated indicator data to a coordinated write component; converting, by the coordinated write component, the pre-aggregated indicator data into conversion indicator data that has a target storage format, and performing merging processing on the conversion indicator data to obtain storage indicator data; writing the storage indicator data into a database component; and writing, by the database component, the storage indicator data into a storage disk.

20 Claims, 8 Drawing Sheets

(56) References Cited

U.S. PATENT DOCUMENTS

| | | |
|---|---|---|
| 2013/0346533 A1 | 12/2013 | Agrawal et al. |
| 2014/0046952 A1* | 2/2014 | McPhail ............... G06F 11/079 |
| | | 707/769 |
| 2014/0114994 A1* | 4/2014 | Lindblad ............. G06F 16/2471 |
| | | 707/E17.014 |
| 2016/0266920 A1* | 9/2016 | Atanasov .............. G06F 11/301 |
| 2019/0121899 A1* | 4/2019 | Kim .................... H04L 67/1097 |
| 2021/0234782 A1* | 7/2021 | Ganapathi ........... H04L 41/5009 |

FOREIGN PATENT DOCUMENTS

| | | |
|---|---|---|
| CN | 109977077 A | 7/2019 |
| CN | 112671602 A | 4/2021 |
| CN | 113220715 A | 8/2021 |
| JP | 2011172026 A | 9/2011 |

OTHER PUBLICATIONS

Tencent Technology, IPRP, PCT/CN2022/097848, Dec. 14, 2023, 6 pgs.

Tencent Technology, ISR, PCT/CN2022/097848, Sep. 7, 2022, 2 pgs.

* cited by examiner

DATA PROCESSING METHOD, APPARATUS, AND SYSTEM, COMPUTER DEVICE, READABLE STORAGE MEDIUM, AND COMPUTER PROGRAM PRODUCT

CROSS-REFERENCE TO RELATED APPLICATIONS

This application is a continuation application of PCT Patent Application No. PCT/CN2022/097848, entitled "DATA PROCESSING METHOD, APPARATUS, AND SYSTEM, COMPUTER DEVICE, READABLE STORAGE MEDIUM, AND COMPUTER PROGRAM PRODUCT" filed on Jun. 9, 2022, which priority to Chinese Patent Application No. 202110772159.5, entitled "DATA PROCESSING METHOD, APPARATUS, AND SYSTEM, COMPUTER DEVICE, READABLE STORAGE MEDIUM, AND COMPUTER PROGRAM PRODUCT" filed on Jul. 8, 2021, all of which is incorporated by reference in embodiments of this application in its entirety.

FIELD OF THE TECHNOLOGY

This application relates to the field of computer technologies, and in particular, to a data processing method, apparatus, and system, a computer device, a readable storage medium, and a computer program product.

BACKGROUND OF THE DISCLOSURE

In some application scenarios (such as video on demand or cloud gaming), to reduce a delay, a service is deployed closer to a user (that is, an edge node). Edge nodes form an edge cluster and performance and stability of a deployed service need to be monitored on the edge cluster. Therefore, indicator data generated in an application program is collected to detect performance and stability of the service. Generally, indicator data is periodically pulled and stored by a service endpoint in each edge cluster. When user equipment needs to acquire the indicator data, a central cluster pulls required indicator data from the service endpoint in the edge cluster, and then feeds back the required indicator data to the user equipment. Because a relatively large quantity of data is generated in the service endpoint, indicator data in a period of time is generally stored, and the data is deleted after a period of time, so as to ensure normal running of the service endpoint. Thus, performance of data storage is poor, and effective data transmission cannot be performed, which is not conducive to storing data of a long life cycle.

SUMMARY

Embodiments of this application provide a data processing method, apparatus, and system, a computer device, a readable storage medium, and a computer program product, so as to implement efficient data transmission by transmitting pre-aggregated indicator data.

An embodiment of this application provides a data processing method performed by a computer network acting as a central cluster, the central cluster including multiple computer devices, and each computer device being configured to run at least one of a transceiver component, a coordinated write component, and a database component; and the method including:
  receiving, by using the transceiver component, collection indicator data sent by an edge cluster;
  performing pre-aggregation processing on the collection indicator data based on the transceiver component to obtain pre-aggregated indicator data, and sending the pre-aggregated indicator data to the coordinated write component;
  converting, by the coordinated write component, the pre-aggregated indicator data into conversion indicator data that has a target storage format, and performing merging processing on the conversion indicator data to obtain storage indicator data; and
  writing, by the database component, the storage indicator data into a storage disk.

An embodiment of this application provides a data processing system, the data processing system including a transceiver node, a coordinated write node, and a database node, and the transceiver node, the coordinated write node, and the database node being respectively implemented by using at least one computer device;
  the transceiver node being configured to receive collection indicator data sent by an edge cluster;
  the transceiver node being further configured to: perform pre-aggregation processing on the collection indicator data to obtain pre-aggregated indicator data, and send the pre-aggregated indicator data to the coordinated write node;
  the coordinated write node being configured to: convert the pre-aggregated indicator data into conversion indicator data that has a target storage format, and perform merging processing on the conversion indicator data to obtain storage indicator data;
  the coordinated write node being further configured to write the storage indicator data into the database node; and
  the database node being configured to write the storage indicator data into a storage disk.

An embodiment of this application provides a data processing apparatus, which is applied to a computer device. The computer device runs a transceiver component, a coordinated write component, and a database component. The apparatus includes:
  an indicator collection module, configured to receive, by using the transceiver component, collection indicator data sent by an edge cluster;
  a data push module, configured to: perform pre-aggregation processing on the collection indicator data based on the transceiver component to obtain pre-aggregated indicator data, and send the pre-aggregated indicator data to the coordinated write component;
  a data conversion module, configured to convert, based on the coordinated write component, the pre-aggregated indicator data into conversion indicator data that has a target storage format;
  a data compression module, configured to perform merging processing on the conversion indicator data to obtain storage indicator data; and
  a data storage module, configured to write the storage indicator data into the database component, so that the database component writes the storage indicator data into a storage disk.

An embodiment of this application provides a computer network acting as a central cluster, the central cluster comprising multiple computer devices, each computer device comprising a processor, a memory, and a computer program being configured to run at least one of a transceiver component, a coordinated write component, and a database component and collectively causing the central cluster to perform the aforementioned data processing method.

An embodiment of this application provides a non-transitory computer readable storage medium, storing a plurality of computer programs being configured to run, respectively, a transceiver component, a coordinated write component, and a database component, and each computer program being loaded and executed by a processor of a respective one of a plurality of computer devices constituting a computer network acting as a central cluster, causing the central server to perform the aforementioned data processing method in the embodiment of this application.

By implementing the embodiments of this application, the following beneficial effects are obtained:

In the embodiments of this application, a transceiver component, a coordinated write component, a database component, and the like are running in a central cluster, and obtained data is pre-aggregated by using the transceiver component, and pre-aggregated indicator data is transmitted to the coordinated write component, so as to reduce a data amount, thereby implementing efficient data transmission, which helps optimize data storage performance and improve data processing efficiency. Different from a related technology, in the embodiments of this application, obtained storage indicator data is first written into the database component, and then the database component writes the storage indicator data into a storage disk, so that the storage indicator data is transferred into the database component, and the storage indicator data does not need to be deleted after a period of time of storage, so as to increase a life cycle of data storage.

DESCRIPTION OF EMBODIMENTS

Figure 1:
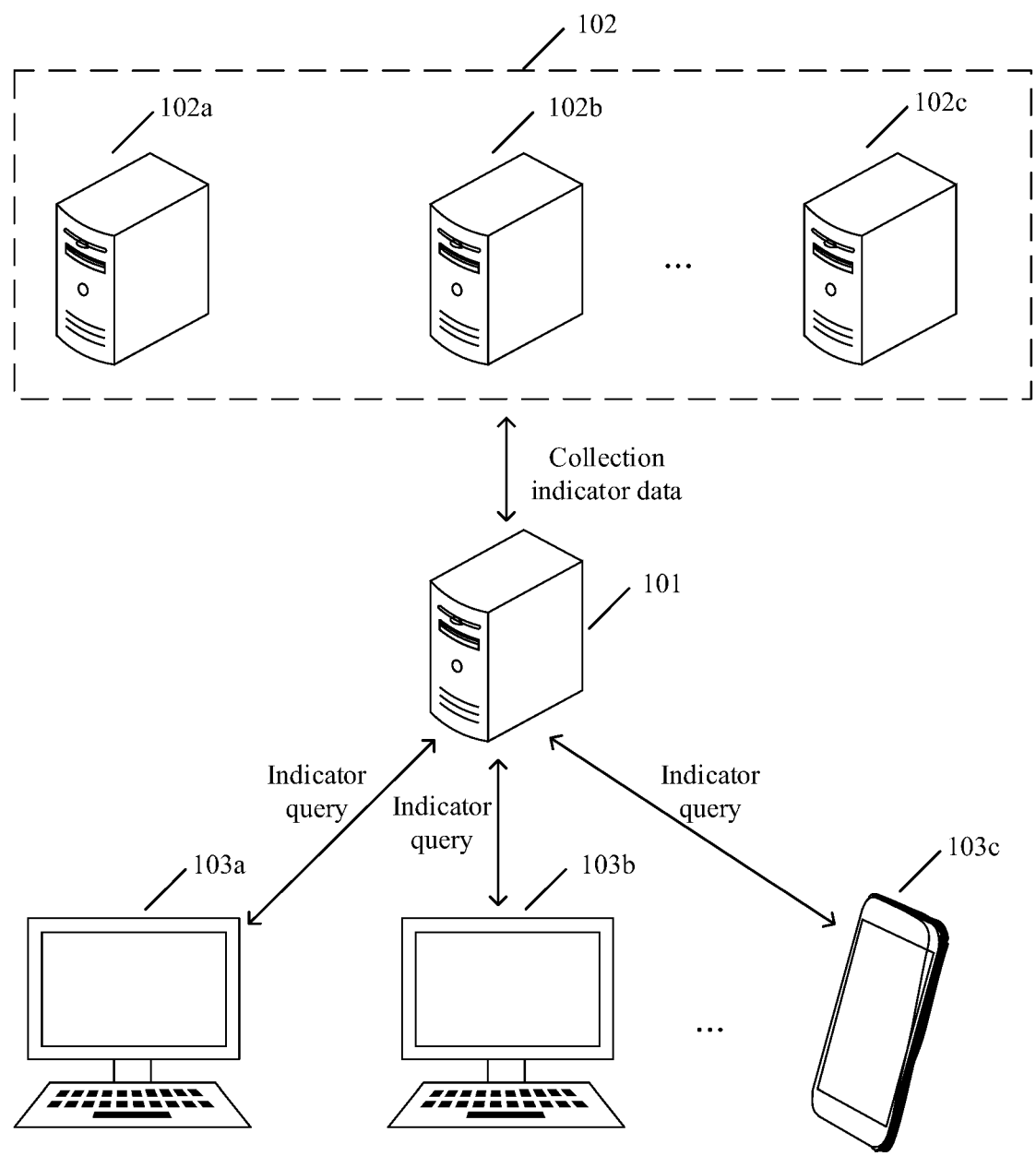
FIG. 1 is a diagram of a network interaction architecture of data processing according to an embodiment of this application.

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

For example, the embodiments of this application may implement data transmission, storage, and the like by using a cloud technology, a blockchain technology, and the like.

Cloud storage is a new concept extended and developed on a concept of cloud computing. A distributed cloud storage system (hereinafter referred to as a storage system) refers to a storage system that combines various storage devices (also referred to as storage nodes) in a network by using functions such as a cluster application, a grid technology, and a distributed storage file system, to work together by using application software or application interfaces to provide data storage and service access functions to the outside.

A storage method for a storage system is: creating a logical volume, and allocating physical storage space to each logical volume when creating the logical volume, where the physical storage space may be made up of a disk of a storage device or disks of several storage devices. A client stores data on a logical volume, that is, stores data on a file system. The file system divides the data into many parts, and each part is an object. The object includes not only data but also additional information such as a data identifier (ID). The file system writes each object into physical storage space of the logical volume, and the file system records storage location information of each object. Therefore, when the client requests to access the data, the file system can enable the client to access the data according to the storage location information of each object.

A process in which a storage system allocates physical storage space to a logical volume is as follows: According to a capacity estimate of an object stored in a logical volume (the estimate often has a large margin relative to a capacity of an object actually to be stored) and a group of a redundant array of independent disk (RAID), physical storage space is pre-divided into stripes, and one logical volume may be understood as one stripe, so that the physical storage space is allocated to the logical volume. In the embodiments of this application, storage of collection indicator data may be implemented based on the foregoing cloud storage technology.

For example, a data processing system in the embodiments of this application includes a central cluster and an edge cluster. The edge cluster may include at least one service endpoint, and more indicator data may be generated in each service endpoint. Therefore, in the embodiments of this application, processing of the indicator data may also be implemented based on big data. Big data refers to a data set that cannot be scraped, managed, and processed by using a conventional software tool within a specific time range, and is a massive, high-growth, and diversified information asset that requires a new processing mode to have a stronger decision-making power, insight discovery power, and process optimization capability.

In some embodiments, a blockchain is a new application mode of computer technologies such as distributed data storage, point-to-point transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include a blockchain underlying platform, a platform product service layer, and an application service layer.

In the embodiments of this application, indicator data processing may be implemented based on the cloud technology and the blockchain technology. The embodiments of this application may be applied to the field of cloud gaming, and indicator data generated by cloud gaming is monitored. Cloud gaming is also referred to as gaming on demand, and is an online game technology based on a cloud computing technology. The cloud gaming technology enables a thin client with relatively limited graphics processing and data computing capabilities to run high-quality games. In a cloud gaming scenario, a game does not run on a game terminal of a player, but runs on a cloud server, and the cloud server renders a game scenario as a video/audio stream and transmits the video/audio stream to the game terminal of the player via a network. The game terminal of the player does not need to have a powerful graphics calculation and data processing capability, and only needs to have a basic streaming media playback capability and a capability of obtaining an instruction inputted by the player and sending the instruction to the cloud server. For example, the embodiments of this application may be further applied to the application program monitoring field, to monitor indicator data generated in an application program, or the like, which is not limited herein. The application program may be any application, such as a video application program, a file editing application program, or a music application program.

In the embodiments of this application, referring to FIG. 1, FIG. 1 is a diagram of a network interaction architecture of data processing according to an embodiment of this application. This embodiment of this application may be implemented by a central cluster 101. The central cluster 101 is a cluster formed by multiple computer devices in which an associated application program is located. A service related to the application program may be deployed, and is used for managing one or more edge clusters, may manage a service endpoint in each edge cluster, and may provide a service to the edge cluster. The central cluster 101 may exchange data with an edge cluster 102. The edge cluster 102 may include one or at least two service endpoints, such as a service endpoint 102a, a service endpoint 102b, and a service endpoint 102c. Each service endpoint may be considered as an edge node, where the edge cluster 102 includes a computer room or node that is closer to a user than the central cluster, and a computer room or node deployed with a service is referred to as a service endpoint or an edge node. Storage indicator data is periodically pulled by using the service endpoint in the edge cluster, and a transmission distance between the edge cluster and user equipment is closer relative to the central cluster. The central cluster 101 may acquire collection indicator data from any service endpoint, where the collection indicator data is indicator data generated in the service endpoint, or indicator data detected by the service endpoint. The central cluster 101 may perform compression processing, conversion, and the like on the acquired collection indicator data to obtain storage indicator data (indicator data for storage), and write the storage indicator data into a database component included in the central cluster.

The central cluster 201 includes multiple computer devices, where each computer device completes the data processing method provided in the embodiment of this application by running at least one component having a specific function module (for example, a transceiver component (with a function of receiving and receiving data), a coordinated write component (with a function of writing data), a database component (with a function of writing data to a disk), an indicator query component (with a function of querying an indicator), and an indicator visualization component (with a function of visualizing an indicator). At least one computer device that runs the same component forms a node in the central cluster. For example, at least one computer device that runs a transceiver component forms a transceiver node in the central cluster, at least one computer device that runs a coordinated write component forms a coordinated write node in the central cluster, at least one computer device that runs a database component forms a database node in the central cluster, at least one computer device that runs an indicator query component forms an indicator query node in the central cluster, and at least one computer device that runs an indicator visualization component forms an indicator visualization node in the central cluster.

In some embodiments, the central cluster 101 may receive indicator query information sent by user equipment (for example, user equipment 103a, user equipment 103b, or user equipment 103c), obtain an indicator query result from a database component based on the indicator query information, and send the indicator query result to the user equipment.

Figure 2:
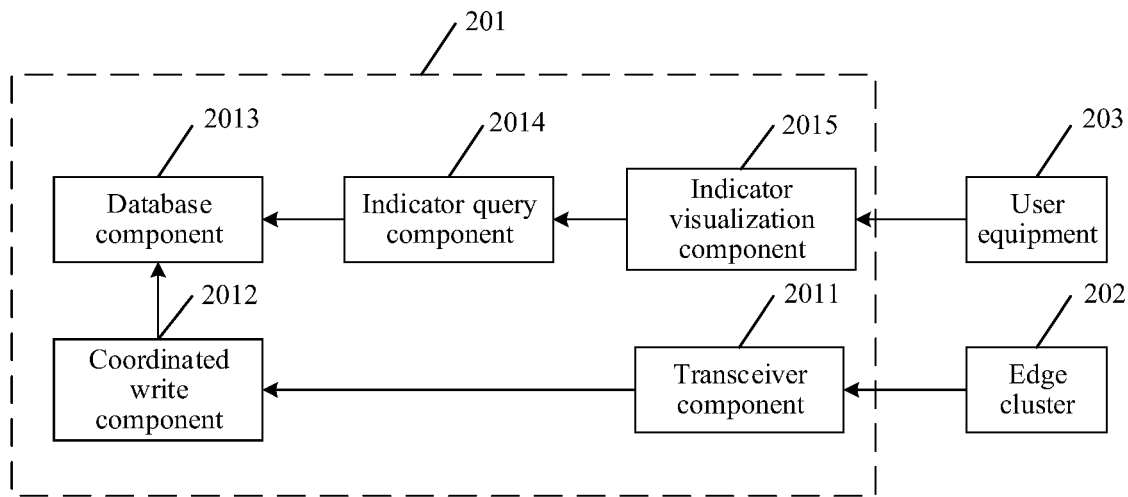
FIG. 2 is an architecture diagram of data processing according to an embodiment of this application.

Referring to FIG. 2, FIG. 2 is an architecture diagram of data processing according to an embodiment of this application. As shown in FIG. 2, the data processing system includes a central cluster 201, an edge cluster 202, and user equipment 203. The central cluster 201 includes multiple computer devices, and each computer device is configured to run at least one of a transceiver component 2011, a coordinated write component 2012, a database component 2013, an indicator query component 2014, and an indicator visualization component 2015. The edge cluster 202 may include at least one service endpoint.

For example, the transceiver component 2011 receives collection indicator data sent by the edge cluster 202, the transceiver component 2011 performs pre-aggregation processing on the collection indicator data to obtain pre-aggregated indicator data, and sends the pre-aggregated indicator data to the coordinated write component 2012, the coordinated write component 2012 converts the pre-aggregated indicator data into conversion indicator data that has a target storage format, merges the conversion indicator data to obtain storage indicator data, and writes the storage indicator data into the database component 2013, and the database component 2013 writes the storage indicator data into a storage disk. The central cluster 201 may further receive indicator query information sent by the user equipment 203, obtain an indicator query result from the database component 2013 based on the indicator query information, and send the indicator query result to the user equipment 203.

Figure 3:
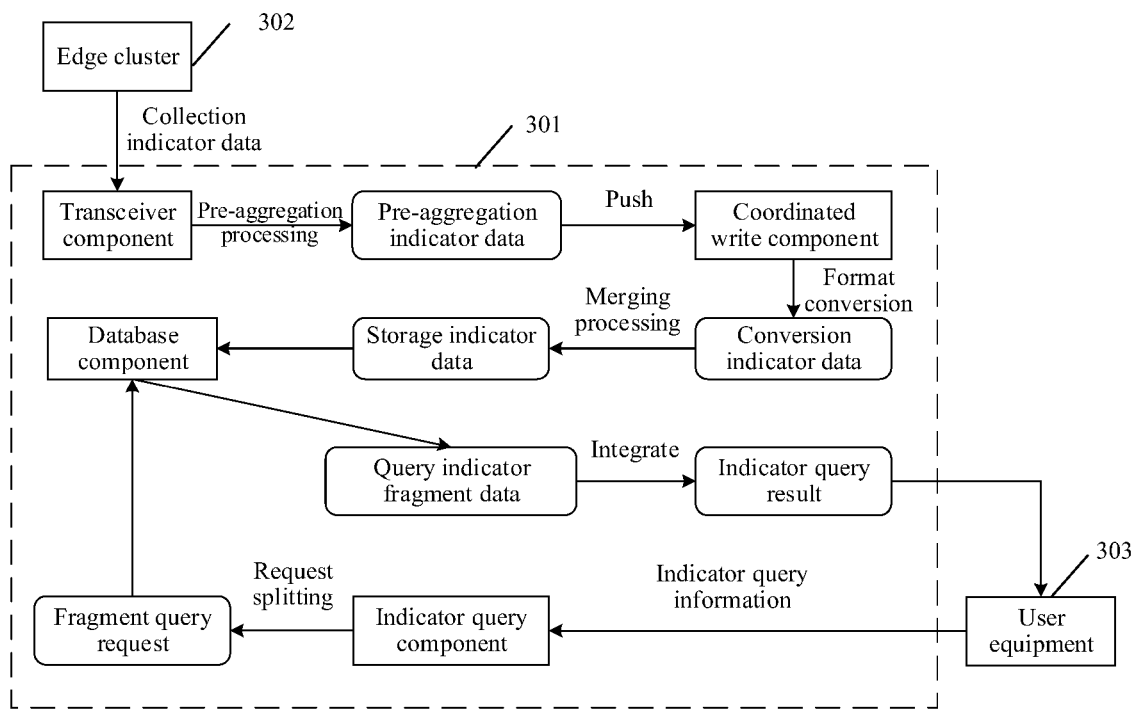
FIG. 3 is a schematic diagram of a data processing scenario according to an embodiment of this application.

In some embodiments, referring to FIG. 3, FIG. 3 is a schematic diagram of a data processing scenario according to an embodiment of this application. As shown in FIG. 3, a central cluster 301 may receive, by using a transceiver component, collection indicator data sent by an edge cluster 302. The transceiver component performs pre-aggregation processing on the collection indicator data to obtain pre-aggregated indicator data, and sends the pre-aggregated indicator data to a coordinated write component. The performing format conversion on the pre-aggregated indicator data based on the coordinated write component is specifically converting the pre-aggregated indicator data into conversion indicator data that has a target storage format, and performing merging processing on the conversion indicator data to obtain storage indicator data.

In some embodiments, the central cluster 301 may write the storage indicator data to a database component, and may write the storage indicator data to a storage disk based on the database component. In the foregoing process, the transceiver component, the coordinated write component, the database component, and the like are integrated into the central cluster, and the transceiver component may compress the obtained data to reduce a data amount, and send the compressed data to the coordinated write component, so that data transmission can be implemented more efficiently, and data storage performance is optimized. In addition, the feature of writing the obtained storage indicator data into the database component, and writing the storage indicator data into the storage disk based on the database component improves data processing efficiency.

In some embodiments, the central cluster 301 may further receive indicator query information sent by user equipment 303, and send an indicator query request to the indicator query component based on the indicator query information, the indicator query request including the indicator query information. The central cluster 301 may split the indicator query request into M fragment query requests based on the indicator query component, where M is a positive integer. Query indicator fragment data respectively corresponding to the M fragment query requests is acquired from N database components based on the M fragment query requests, the M query indicator fragment data are integrated to obtain an indicator query result, and the indicator query result is sent to the user equipment 303.

It may be understood that the central cluster, the edge cluster, and the user equipment mentioned in the embodiments of this application may all be computer devices. The central cluster may include one computer device or at least two computer devices, and the edge cluster may include one computer device or at least two computer devices. The computer device in the embodiments of this application includes but is not limited to a terminal device or a server. In other words, the computer device may be a server or a terminal device, or may be a system including a server and a terminal device. The foregoing mentioned terminal device may be an electronic device, including but not limited to a mobile phone, a tablet computer, a desktop computer, a laptop computer, a palmtop computer, an in-vehicle device, an augmented reality/virtual reality (AR/VR) device, a helmet display, an intelligent television, a wearable device, an intelligent sound box, a digital camera, a camera, another mobile Internet device (MID) that has a network access capability, or a terminal device in a scenario such as a train, a ship, or a flight. The foregoing mentioned server may be an independent physical server, or may be a server cluster or a distributed system formed by multiple physical servers, or may be a cloud server that provides basic cloud computing service such as a cloud service, a cloud database, cloud computing, a cloud function, cloud storage, a network service, cloud communication, a middleware service, a domain name service, a security service, a vehicle infrastructure cooperative system, a content distribution network (CDN), big data, and an artificial intelligence platform.

For example, the data involved in this embodiment of this application may be stored in a computer device, or may be stored based on a cloud storage technology, which is not limited herein.

Figure 4:
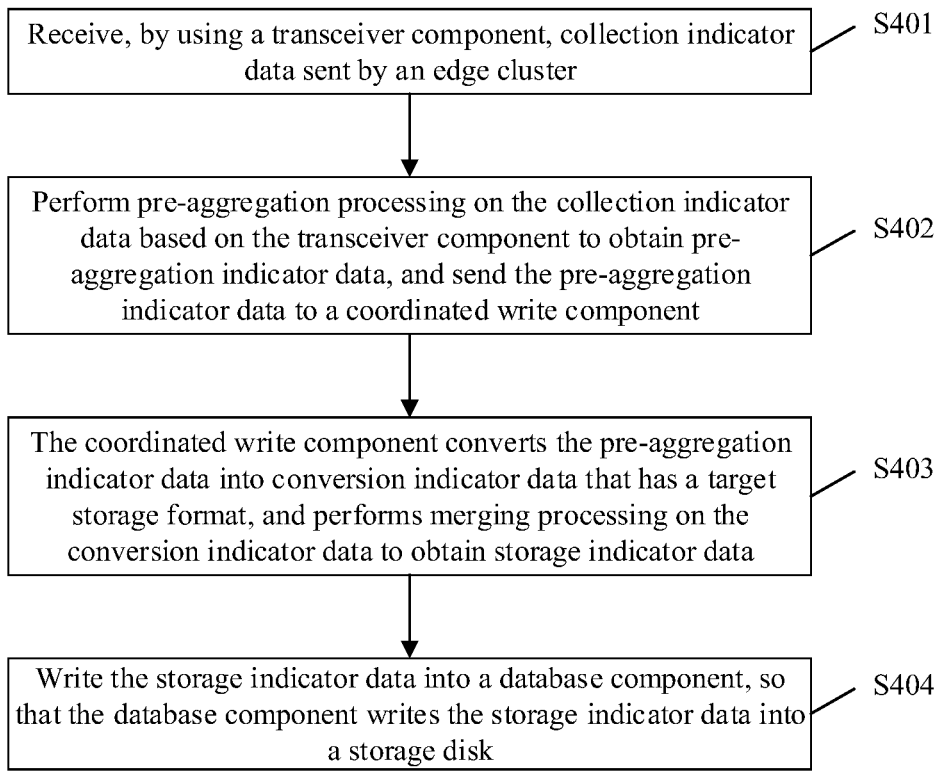
FIG. 4 is a flowchart of a data storage method according to an embodiment of this application.

In some embodiments, referring to FIG. 4, FIG. 4 is a flowchart of a data storage method according to an embodiment of this application. As shown in FIG. 4, the method is implemented by a central cluster. The central cluster includes multiple computer devices. Each computer device is configured to run at least one of a transceiver component, a coordinated write component, a database component, an indicator query component, and an indicator visualization component. The data storage process includes the following steps:

Step S401: Receive, by using the transceiver component, collection indicator data sent by an edge cluster.

In this embodiment of this application, the edge cluster may include at least one service endpoint, and the central cluster may receive, by using the transceiver component, collection indicator data sent by any one service endpoint or any multiple (that is, at least two) service endpoints in the edge cluster. The collection indicator data is specific data corresponding to a collected indicator, and the indicator includes but is not limited to a round-trip time (RTT) per second, a packet loss rate, a data update frequency, and the like, and may reflect performance of an application program. The collection indicator data is data corresponding to an indicator collected from associated user equipment (that is, user equipment using an application program) in the edge cluster, for example, for the indicator "RTT", collection indicator data corresponding to the indicator "RTT" collected by the edge cluster may be "0.5 second".

The transceiver component is a component that can obtain data from the edge cluster, and send the obtained data to another component, that is, the transceiver component is a component that can receive data and push data.

In some embodiments, the transceiver component may include an indicator proxy component. The central cluster may establish a long network connection to the edge cluster by using the indicator proxy component, and receive, by using the long network connection, the collection indicator data sent by the edge cluster. Alternatively, the transceiver component includes an indicator proxy component and a monitoring and collection component. The central cluster may establish a long network connection to the edge cluster by using the indicator proxy component included in the transceiver component, receive, by using the long network connection, the collection indicator data sent by the edge cluster, and send the collection indicator data to the monitoring and collection component.

For example, the indicator proxy component is equivalent to an access gateway, such as a MetricProxy component. The indicator proxy component may receive a transport control protocol (TCP) connection of the edge cluster, maintain a connection and a heartbeat with the edge cluster, that is, establish a long network connection to the edge cluster, may receive the collection indicator data sent by the edge cluster, and may push processed collection indicator data to another component (such as the monitoring and collection component) in the central cluster.

For example, the monitoring and collection component may be considered as a component integrated with a pre-aggregation function. For example, a Prometheus component may receive an indicator push request of the indicator proxy component, acquire collection indicator data pushed by the indicator proxy component, and perform pre-aggregation processing on the collection indicator data. For example, the obtained data may be cached into the monitoring and collection component.

For example, the long network connection is a network connection that is between the indicator proxy component and the edge cluster for a long time (a specified time threshold), and multiple data packets may be sent, such as a transmission control protocol (TCP) long connection or a Hypertext Transfer Protocol (HTTP) long connection, which is not limited herein. A heartbeat may be used for maintaining the long network connection. For example, a service endpoint in the edge cluster is used as an example, a heartbeat packet is sent between the service endpoint and the indicator proxy component, so as to maintain the long network connection between the service endpoint and the proxy component. For example, the HTTP long connection has overhead for link establishment and disconnection each time.

To reduce overhead brought by link disconnection and improve throughput, a long network connection between the indicator proxy component and the edge cluster may be established by using a long connection other than an HTTP long connection (for example, a TCP long connection). In other words, long connections of different protocol types have different characteristics. When a long network connection between the indicator proxy component and the edge cluster is established, a target connection characteristic that meets an actual requirement may be obtained, and a protocol type corresponding to the target connection characteristic is obtained, and a long network connection is established between the indicator proxy component and the edge cluster based on the protocol type, where the target connection characteristic refers to a characteristic determined according to a requirement for achieving a connection effect (for example, low link establishment and disconnection overhead and low link maintenance overhead). For example, if the target connection characteristic is a characteristic with low link establishment and disconnection overhead (that is, a requirement of low link establishment and disconnection overhead needs to be met), TCP may be determined as a protocol type corresponding to the target connection characteristic. Based on the protocol type, a TCP long connection is established between the indicator proxy component and the edge cluster, so that a connection between the indicator proxy component and the edge cluster does not frequently encounter link establishment and disconnection, and overhead for link establishment and disconnection can be reduced. If the target connection characteristic is a characteristic of low connection maintenance overhead (that is, a requirement of low connection maintenance overhead needs to be reached), HTTP may be determined as a protocol type corresponding to the target connection characteristic. Based on the protocol type, an HTTP long connection is established between the indicator proxy component and the edge cluster, so that a connection between the indicator proxy component and the edge cluster may be disconnected when the indicator proxy component is idle. This is not limited herein. The indicator proxy component is equivalent to a network access gateway, may receive a network connection (including a long network connection and a short network connection) of the edge cluster, and may maintain a network connection and a heartbeat between the indicator proxy component and the edge cluster.

In some embodiments, the central cluster may receive, by using a long network connection, the collection indicator data sent by the edge cluster in the following manner: receiving, by using the long network connection, to-be-processed indicator data sent by the edge cluster; and acquiring, by the indicator proxy component, an indicator attribute tag of the to-be-processed indicator data, and performing merging processing on to-be-processed indicator data that has a same indicator attribute tag to obtain the collection indicator data.

The indicator attribute tag is used for indicating an indicator attribute corresponding to the to-be-processed indicator data, and may be an attribute tag of the to-be-processed indicator data, such as a unit attribute tag (such as a time attribute tag, a distance attribute tag, or a rate attribute tag) corresponding to the to-be-processed indicator data, or may be an attribute tag of an associated object of the to-be-processed indicator data. For example, the to-be-processed indicator data is indicator data obtained by monitoring an application program, and the indicator attribute tag of the to-be-processed indicator data may be an attribute tag of a user associated with the to-be-processed indicator data, such as an age tag or a gender tag, which is not limited herein.

For example, the edge cluster may acquire to-be-processed indicator data and indicator information of the to-be-processed indicator data, where the indicator information may include f pieces of indicator attribute information, the indicator attribute information includes but is not limited to an indicator attribute tag, an indicator name, an indicator collection time, and the like of the to-be-processed indicator data, and f is a positive integer. The edge cluster sends the obtained to-be-processed indicator data and the to-be-processed indicator data indicator information to the indicator proxy component. For example, the edge cluster may acquire application data generated in the application program, and perform puncturing processing on the application data to obtain to-be-processed indicator data. The puncturing processing refers to sorting the application data generated in the application program, that is, performing association processing on indicator information and indicator data in the obtained application data. The edge cluster may acquire to-be-processed indicator data corresponding to a target indicator, where the target indicator includes but is not limited to a round-trip time (RTT) per second, a packet loss rate, a data update frequency, and the like. The to-be-processed indicator data may be represented by using a diagram, a text, a list, or the like, as shown in the following Table 1:

TABLE 1

| | Indicator information | | | To-be- |
| Indicator name | Indicator attribute tag | | Indicator collection time | processed indicator data |
| | Tag type A | Tag type B ... | ... | |
|---|---|---|---|---|
| RTT | Attribute tag a1 | Attribute tag b1 ... | Collection time 1 ... | Indicator data 1 |
| RTT | Attribute tag a2 | Attribute tag b1 ... | Collection time 1 ... | Indicator data 2 |
| Packet loss rate | Attribute tag a1 | Attribute tag b2 ... | Collection time 2 ... | Indicator data 3 |
| Packet loss rate | Attribute tag a2 | Attribute tag b1 ... | Collection time 1 ... | Indicator data 4 |
| ... | ... | ... | ... ... | ... |

As shown in the foregoing Table 1, Table 1 is an expression form of to-be-processed indicator data and indicator information of the to-be-processed indicator data. Table 1 indicates that THE central cluster receives to-be-processed indicator data based on THE indicator proxy component, a quantity of to-be-processed indicator data is d, d is a positive integer, d pieces of to-be-processed indicator data includes indicator data 1, indicator data 2, and indicator data 3, where an indicator name of the indicator data 1 is RTT, an indicator attribute tag is "attribute tag a1 and attribute tag b1", and an indicator collection time is collection time 1, . . . . An indicator name of the indicator data 2 is RTT, an indicator attribute tag is attribute tag a2 and attribute tag b1, and an indicator collection time is collection time 1, . . . . An indicator name of the indicator data 3 is packet loss rate, an indicator attribute tag is attribute tag a1 and attribute tag b2, and an indicator collection time is collection time 2, . . . . An indicator name of the indicator data 4 is packet loss rate, an indicator attribute tag is attribute tag a2 and attribute tag b1, and an indicator collection time is collection time 1, . . . . For example, the to-be-processed indicator data may be represented in a format of "<indicator name>{<indicator attribute tag>=<to-be-processed indicator data>, . . . }", that is, the to-be-processed indicator data may be represented by grouping by using the indicator name. For example, the to-be-processed indicator data in Table 1 may be represented as "<RTT>{<attribute tag a1, attribute tag b1 . . . >=<indicator data 1>, <attribute tag a2, attribute tag b1 . . . >=<indicator data 2> . . . }; <packet loss rate>{<attribute tag a1, attribute tag b2 . . . >=<indicator data 3>, <attribute tag a2, attribute tag b1 . . . >=<indicator data 4> . . . }". The indicator name is generally used for reflecting a meaning of a monitored sample. For example, http_request_total is used for indicating a total quantity of HTTP requests received by a current system. The indicator attribute tag is used for representing a characteristic dimension of a current sample (that is, to-be-processed indicator data). By using these dimensions, processing such as filtering and aggregation may be performed on the sample data.

For example, the central cluster may acquire the indicator attribute tag of the to-be-processed indicator data based on the indicator proxy component, perform merging processing on the to-be-processed indicator data that has the same indicator attribute tag to obtain the collection indicator data. For example, the indicator attribute tag includes an age attribute tag and a gender attribute tag, and performs merging processing on the to-be-processed indicator data that has the same age attribute tag and gender attribute tag to obtain the collection indicator data, thereby reducing a storage amount of the indicator data. The to-be-processed indicator data in Table 1 is used as an example. For the obtained collection indicator data, refer to Table 2.

TABLE 2

| Indicator information | | | | | | |
|---|---|---|---|---|---|---|
| Indicator attribute tag | | | Indicator | Collection | | Collection |
| Tag type A | Tag type B | . . . | name | time | . . . | data |
| Attribute tag a1 | Attribute tag b1 | . . . | RTT | Collection time 1 | . . . | Indicator data 1 |
| Attribute tag a2 | Attribute tag b1 | . . . | RTT | Collection time 1 | . . . | Indicator data 2 |
| | | . . . | Packet loss rate | Collection time 1 | . . . | Indicator data 4 |
| Attribute tag a1 | Attribute tag b2 | . . . | Packet loss rate | Collection time 2 | . . . | Indicator data 3 |
| . . . | . . . | . . . | . . . | . . . | . . . | . . . |

It may be learned from Table 1 that the indicator data 2 and the indicator data 4 have the same indicator attribute tag "attribute tag a2 and attribute tag b1", and the to-be-processed indicator data 2 and the indicator data 4 are combined to obtain collection indicator data. For the collection indicator data, refer to Table 2. For example, the central cluster may perform merging processing on to-be-processed indicator data based on the indicator name and the indicator attribute tag, that is, perform merging processing on to-be-processed indicator data that has the same indicator name and indicator attribute tag to obtain collection indicator data. In this case, because the indicator name of the indicator data 2 and the indicator name of the indicator data 4 are different, merging processing is not performed on the indicator data 2 and the indicator data 4. The collection indicator data may be represented as "<indicator name>{<indicator attribute tag>=<to-be-processed indicator data, . . . >, . . . }", where"<to-be-processed indicator data, . . . >" indicates a group of to-be-processed indicator data with the same indicator name and indicator attribute tag. In this case, the collection indicator data may be shown in Table 3:

TABLE 3

| Indicator information | | | | To-be- |
|---|---|---|---|---|
| Indicator name | Indicator attribute tag | | Indicator collection time | processed indicator data |
| | Tag type A | Tag type B . . . | time . . . | |
| RTT | Attribute tag a1 | Attribute tag b1 . . . | Collection time 1 . . . | Indicator data 1 |
| | Attribute tag a2 | Attribute tag b1 . . . | Collection time 1 . . . | Indicator data 2 |
| Packet loss rate | Attribute tag a1 | Attribute tag b2 . . . | Collection time 2 . . . | Indicator data 3 |
| | Attribute tag a2 | Attribute tag b1 . . . | Collection time 1 . . . | Indicator data 4 |
| . . . | . . . | . . . . . . | . . . . . . | . . . |

For example, the central cluster may acquire a cluster resource status. If the cluster resource status is a cluster resource sufficient state, the central cluster may directly receive the collection indicator data sent by the service endpoint in the edge cluster. If the cluster resource status is a cluster resource insufficient state, the central cluster may generate a connection random number corresponding to the service endpoint in the edge cluster, and obtain, based on the connection random number, the collection indicator data sent by the service endpoint. For example, the central cluster may establish a connection to the service endpoint in the edge cluster by using the transceiver component, acquire endpoint information of the service endpoint, and generate a connection random number based on the endpoint information.

The connection random number is a random number used for representing a connection established between the service endpoint and the central cluster, the connection random number is located in a random number range, and the random number range is determined based on a connection establishment range. That is, the central cluster may generate, according to endpoint information, a connection random number in the random number range, so as to indicate whether the central cluster receives the indicator data sent by the service endpoint. The endpoint information may include an endpoint identifier of the service endpoint, endpoint memory space, endpoint transmission bandwidth, and the like. The central cluster may generate a connection random number according to one or any multiple elements in the endpoint information. For example, the central cluster may directly process one or any multiple elements in endpoint information by using a random number generation function (such as a random function (rand function) or a random seed function (srand)) to generate a connection random number. Alternatively, the central cluster may acquire an element hash value corresponding to one or any multiple elements in the endpoint information, and perform remainder calculation on the element hash value to obtain a connection random number. For example, the central cluster may acquire a hash value in a specified location range from the element hash value, and perform remainder calculation on the hash value in the specified location range to obtain a connection random number, which is not limited herein. The transceiver component may include an indicator proxy component, or may include an indicator proxy component and a monitoring and collection component. In both cases, the central cluster establishes a connection to the service endpoint in the edge cluster by using the indicator proxy component in the transceiver component, so as to generate a connection random number. For example, the central cluster may generate a connection random number according to endpoint information, or may generate a connection random number according to endpoint information and a system network time, or may generate a connection random number according to a hash value of endpoint information, which is not limited herein.

In some embodiments, a connection establishment range is obtained, where the connection establishment range may be considered as a random number threshold range, and is used for implementing a percentage discard request, so that the central cluster can process the indicator data sent by the service endpoint corresponding to the random number located in the connection establishment range, and discard the indicator data sent by the service endpoint corresponding to the random number located in the connection establishment range. For example, when the connection random number is located in the connection establishment range, the collection indicator data sent by the service endpoint in the edge cluster is received. When the connection random number is not in the connection establishment range, received historical indicator data sent by the service endpoint in the edge cluster is acquired, and the historical indicator data is discarded, that is, all indicator data associated with the service endpoint corresponding to the connection random number is discarded, so as to ensure integrity of the indicator data. For example, an indicator push failure message may be sent to the service endpoint in the edge cluster.

For example, the central cluster may determine a connection establishment range based on an indicator receive ratio. Assuming that the indicator receive ratio is 70%, and the connection random number range is 1-100, the connection establishment range is any consecutive 70% numbers of 1-100. For example, the connection establishment range may be 1-70, that is, the central cluster may generate a connection random number corresponding to the service endpoint in 1-100. If the connection random number belongs to 1-70, the collection indicator data sent by the service endpoint in the edge cluster is received. If the connection random number does not belong to 1-70, the indicator data associated with the service endpoint in the edge cluster is discarded. For example, an indicator push failure message may be sent to the service endpoint in the edge cluster. For example, if a service endpoint A and a service endpoint B exist, it is assumed that a connection random number corresponding to the service endpoint A is in the connection establishment range, and a connection random number corresponding to the service endpoint B is not in the connection establishment range, the central cluster may acquire historical indicator data sent by the service endpoint B, and discard historical indicator data sent by the service endpoint B. When a connection random number corresponding to a service endpoint is not within the connection establishment range, the central cluster may discard only historical indicator data sent by the service endpoint, and maintain a network connection to the service endpoint. In this process, a probability of receiving indicator data of each service endpoint by the central cluster may be the same. In addition, data at each service endpoint may be discarded according to a percentage, so that when a cluster resource status of the central cluster is a cluster resource insufficient state, the indicator data that needs to be processed may be reduced to a certain extent, thereby improving resource utilization efficiency of the central cluster.

For example, the central cluster may receive, based on an indicator push amount of the edge cluster, the collection indicator data sent by the service endpoint in the edge cluster, where the indicator push amount refers to a total quantity of indicator data pushed by the edge cluster to the central cluster, that is, a quantity of resources occupied by the indicator data pushed by the edge cluster to the central cluster. For example, the central cluster may monitor an indicator push amount of the edge cluster. When the indicator push amount is less than or equal to an indicator processing amount threshold, the central cluster may receive the collection indicator data sent by the service endpoint in the edge cluster. When the indicator push amount is greater than the indicator processing amount threshold, it indicates that a data amount of indicator data received by the central cluster exceeds a maximum data amount that can be processed by the central cluster, and the obtained indicator data may be filtered. For example, the transceiver component may establish a connection to the service endpoint in the edge cluster, acquire endpoint information of the service endpoint, generate a connection random number according to the endpoint information, and determine, based on the connection random number, a process of receiving the collection indicator data, so as to reduce a data amount of indicator data that needs to be processed by the central cluster, and reduce resource pressure of the central cluster.

In some embodiments, the central cluster may further receive, by using the transceiver component, initial indicator data sent by the edge cluster, acquire a to-be-collected indicator type, and generate collection indicator data based on indicator data corresponding to the to-be-collected indicator type and acquired from the initial indicator data.

The initial indicator data may be considered as indicator data directly sent by the edge cluster. The to-be-collected indicator type is used for indicating a type of indicator data that the indicator proxy component needs to receive. For example, the central cluster may receive, by using the transceiver component, the initial indicator data sent by the edge cluster, to obtain the to-be-collected indicator type, obtain, from the initial indicator data, indicator data corresponding to the to-be-collected indicator type as to-be-processed indicator data, and perform merging processing on the to-be-processed indicator data to obtain the to-be-collection indicator data. Each piece of indicator data in this embodiment of this application refers to indicator data that is in different stages and that is obtained after the central cluster obtains the indicator data from the edge cluster by means of processing in different components, that is, names of different indicator data are used for indicating names of indicator data that is in different stages and that is obtained after different processing.

For example, to reduce complexity of access of a client (that is, the service endpoint in the edge cluster), an indicator interaction logic may be encapsulated into an indicator static library (lib). By default, the static library collects various indicator data obtained by the edge cluster, and indicator data of some indicator types is unnecessary. The central cluster may filter the obtained initial indicator data based on the to-be-collected indicator type, so as to remove irrelevant indicator data, thereby reducing a data amount and reducing pushing pressure of the indicator proxy component for the indicator data.

Step S402: Perform pre-aggregation processing on the collection indicator data based on the transceiver component to obtain pre-aggregated indicator data, and send the pre-aggregated indicator data to the coordinated write component.

In this embodiment of this application, when a data volume of the indicator data combined by the indicator attribute tag is greater than a data volume threshold, relatively large time consumption is generated when the indicator data corresponding to the indicator attribute tag is queried and aggregated. Pre-aggregation means that the indicator data corresponding to the indicator attribute tag is aggregated and calculated before or after the indicator data is written, and stored as another indicator name, so as to reduce query time consumption and save resources. The indicator data is indicator data that needs to be pre-aggregated in the collection indicator data in this embodiment of this application, such as collection indicator data. The transceiver component is integrated with a first data push function, and the first data push function is used for sending the pre-aggregated indicator data to the coordinated write component by using the transceiver component.

If the transceiver component includes an indicator proxy component, the indicator proxy component performs pre-aggregation processing on the collection indicator data to obtain pre-aggregated indicator data, and sends the pre-aggregated indicator data to the coordinated write component. If the transceiver component includes an indicator proxy component and a monitoring and collection component, the indicator proxy component sends the collection indicator data to the monitoring and collection component. The indicator proxy component can freely push the collection indicator data, which is conducive to performance optimization. The monitoring and collection component acquires indicator information of the collection indicator data, acquires an indicator aggregation attribute, and performs indicator conversion (that is, performs an indicator conversion algorithm) on the collection indicator data corresponding to the indicator information that matches the indicator aggregation attribute to obtain the pre-aggregated indicator data. The monitoring and collection component sends a remote write request to the coordinated write component, and sends the pre-aggregated indicator data to the coordinated write component based on the remote write request. The monitoring and collection component stores the pre-aggregated indicator data, and sends the pre-aggregated indicator data in bypass mode to the coordinated write component based on the remote write request.

The indicator proxy component is integrated with a second data push function, the second data push function is used for pushing the collection indicator data to the monitoring and collection component by using the indicator proxy component, the monitoring and collection component is integrated with a third data push function, and the third data push function is used for sending the pre-aggregated indicator data to the coordinated write component by using the monitoring and collection component.

The indicator aggregation attribute and the indicator conversion algorithm may be preset in advance, and are stored in the monitoring and collection component. As shown in the foregoing Table 1 to Table 3, when the indicator data is transmitted in each component, corresponding indicator information is carried.

The indicator aggregation attribute may be an indicator attribute tag of any one or more tag types in the indicator attribute tag, or may be any one or any multiple indicator attribute information in f pieces of indicator attribute information. For example, the indicator conversion algorithm may be performed on collection indicator data that has the same indicator aggregation attribute to obtain pre-aggregated indicator data and a pre-aggregation indicator name corresponding to the pre-aggregated indicator data. The indicator conversion algorithm may be a mean algorithm, a maximum value algorithm, a minimum value algorithm, or a statistical algorithm with a maximum quantity of occurrence times, which is not limited herein.

For example, the indicator aggregation attribute and the indicator conversion algorithm may be referred to as an indicator pre-aggregation rule, and the indicator pre-aggregation rule may be updated according to an actual requirement. For example, there is a group of collection indicator data whose indicator name is RTT. It is assumed that the indicator aggregation attribute is a gender attribute tag in the indicator attribute tag. The indicator conversion algorithm is a mean algorithm. Obtained collection indicator data corresponding to a first gender attribute tag includes "1, 2, 1, 0.5", and the collection indicator data corresponding to the second gender attribute tag includes "2, 3, 2, 3". For collection indicator data corresponding to indicator information that matches the indicator aggregation attribute, the indicator conversion algorithm is performed to obtain pre-aggregated indicator data, so as to obtain that pre-aggregated indicator data corresponding to the first gender attribute tag is "(1+2+1+0.5)/4=1.125", and pre-aggregated indicator data corresponding to a second gender attribute tag is "(2+3+2+3)/4=2.5". For example, a pre-aggregation indicator name corresponding to the first gender attribute tag, such as "first gender RTT mean value", and a pre-aggregation indicator name corresponding to the second gender attribute tag, such as "second gender RTT mean value" may be obtained.

In some embodiments, the indicator proxy component may push the collection indicator data to the monitoring and collection component in the following manner: caching, by the indicator proxy component, the collection indicator data into a to-be-sent indicator queue; and pushing, by the indicator proxy component, the collection indicator data in the to-be-sent indicator queue to the monitoring and collection component.

For example, if a data volume of the collection indicator data is greater than or equal to a data pushing threshold, the collection indicator data in the to-be-sent indicator queue is split based on the data pushing threshold to obtain at least two collection indicator data groups, and the at least two collection indicator data groups are sent in parallel (period push) to the monitoring and collection component based on the second data push function. If the data volume of the collection indicator data is less than the data pushing threshold, the collection indicator data is pushed to the monitoring and collection component by directly using the second data push function of the indicator proxy component and the to-be-sent indicator queue, so as to improve push efficiency of the indicator data. The monitoring and collection component may receive an indicator push request of the indicator proxy component, write the received collection indicator data into the indicator proxy component based on the indicator push request, perform pre-aggregation processing on the collection indicator data to obtain pre-aggregated indicator data, and periodically send the pre-aggregated indicator data to the coordinated write component.

Step S403: The coordinated write component converts the pre-aggregated indicator data into conversion indicator data that has a target storage format, and performs merging processing on the conversion indicator data to obtain storage indicator data.

In this embodiment of this application, the central cluster may receive, based on the coordinated write component, a remote write request sent by the monitoring and collection component, and convert pre-aggregated indicator data into conversion indicator data with a target storage format, where the target storage format is a data format supported by the database component in the central cluster, for example, assuming that the database component is M3DB, the target storage format corresponding to the database component is m3.

In some embodiments, merging of the conversion indicator data may be performed in the following manner: performing, based on the coordinated write component, downsampling processing on the conversion indicator data to obtain downsampling indicator data, acquiring a conversion storage period of the conversion indicator data, and performing combination processing on the downsampling indicator data that has a same conversion storage period to obtain storage indicator data.

The conversion indicator data may be periodically downsampled, or the conversion indicator data may be downsampled according to a downsampling manner corresponding to the database component, for example, a downsampling manner corresponding to m3. The conversion storage period may be a collection time or a generation time of the conversion indicator data (a generation time of collection indicator data corresponding to the conversion indicator data), or the like.

Step S404: Write the storage indicator data into the database component, so that the database component writes the storage indicator data into a storage disk.

For example, a quantity of database components is N, and N is a positive integer. When the storage indicator data is written into the database component, the coordinated write component acquires a storage indicator name and a storage indicator attribute tag of the storage indicator data, generates a storage hash value of the storage indicator data based on the storage indicator name and the storage indicator attribute tag, determines a storage fragment identifier based on the storage hash value, and writes the storage indicator data into the database component corresponding to the storage fragment identifier.

When pre-aggregation processing, merging processing, conversion processing, and the like are performed on the indicator data, the indicator name and the indicator attribute tag of the indicator data are synchronized.

In some embodiments, writing of the storage indicator data into the storage disk may be implemented in the following manner: performing, by the database component, cold and hot analysis processing on the storage indicator data to obtain hot indicator data and cold indicator data that are included in the storage indicator data; and determining a hot data storage area and a cold data storage area in the storage disk, writing the hot indicator data into the hot data storage area, and writing the cold indicator data into the cold data storage area.

The hot indicator data refers to online indicator data that needs to be accessed frequently, and the cold indicator data refers to indicator data that is not accessed frequently. For example, cold and hot analysis processing is performed on the storage indicator data, so as to implement cold and hot separation of the storage indicator data, so that storage of the storage indicator data can be more regular, and indicator data can be better managed, and unused storage indicator data can be cleaned, thereby reducing resource usage of the database component.

Figure 5:
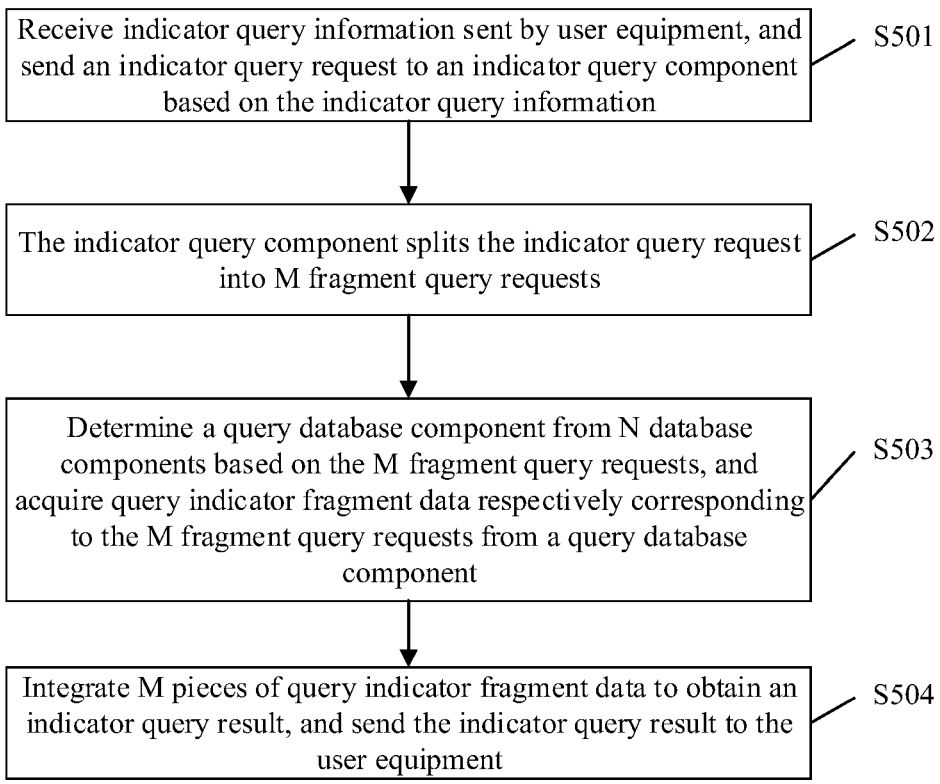
FIG. 5 is a flowchart of a data query method according to an embodiment of this application.

In some embodiments, referring to FIG. 5, FIG. 5 is a flowchart of a data processing method according to an embodiment of this application. As shown in FIG. 5, the method is implemented by a central cluster, and a computer device in the central cluster may further run an indicator query component or the like. The data processing process includes the following steps:

Step S501: Receive indicator query information sent by user equipment, and send an indicator query request to the indicator query component based on the indicator query information.

In this embodiment of this application, the computer device in the central cluster may further run an indicator query component, where a quantity of database components is N, N is a positive integer, and the quantity of database components may be set according to a requirement, that is, the database component has scalability. The central cluster may send an indicator query request to the indicator query component based on the indicator query information, where the indicator query request includes the indicator query information.

In some embodiments, the central cluster may also run an indicator visualization component. For example, the central cluster may receive, based on a visualization component address of the indicator visualization component, indicator query information sent by the user equipment; acquire a query component address of the indicator query component, establish a monitoring panel based on the query component address, and acquire an indicator query statement corresponding to the indicator query information from the monitoring panel; and send an indicator query request to the indicator query component based on the indicator query statement.

Figure 6:
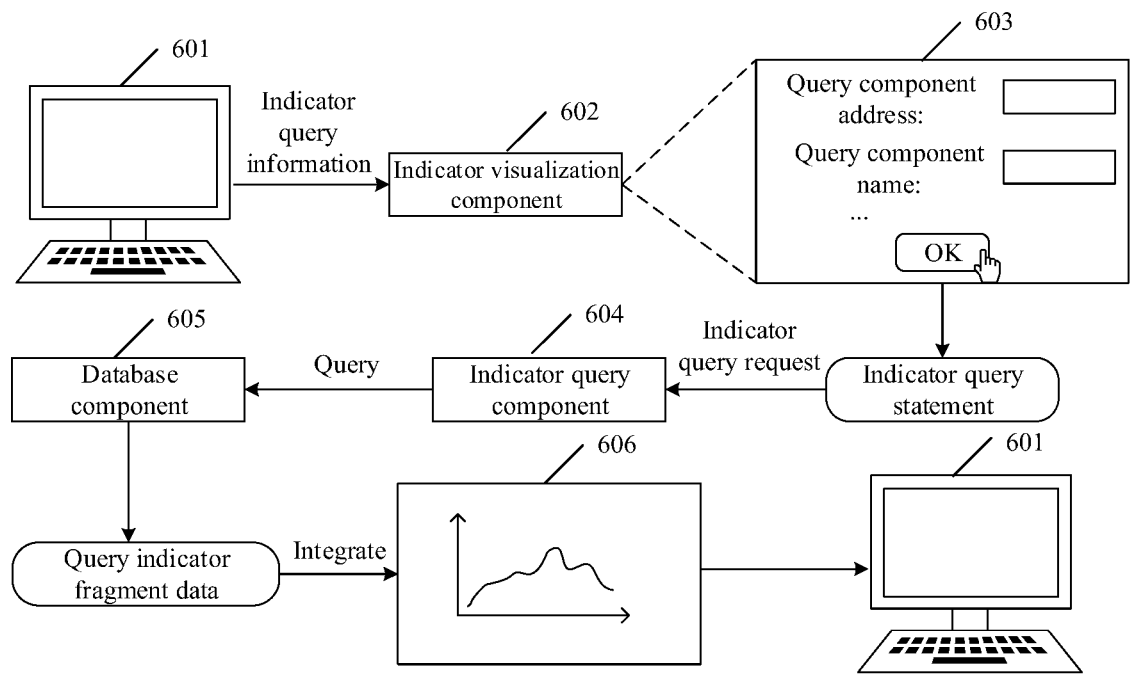
FIG. 6 is a schematic diagram of an indicator query scenario according to an embodiment of this application.

For example, referring to FIG. 6, FIG. 6 is a schematic diagram of an indicator query scenario according to an embodiment of this application. As shown in FIG. 6, the central cluster may receive, based on the visualization component address of the indicator visualization component, indicator query information sent by user equipment 601, establish a monitoring panel 603 based on the indicator query information, generate, based on the monitoring panel 603, an indicator query statement corresponding to the indicator query information, and send the indicator query request to an indicator query component 604 according to the indicator query statement.

For example, the indicator query statement may alternatively be generated by the user equipment. For example, the user equipment may obtain the visualization component address of the indicator visualization component, access the visualization component address, display a visualization component access page, acquire a query component address of the indicator query component based on the visualization component access page, establish a monitoring panel, acquire a query parameter configured in the monitoring panel, generate an indicator query statement according to the query parameter, and send an indicator query request to the indicator visualization component based on the indicator query statement. The central cluster sends the indicator query request to the indicator query component based on the indicator visualization component.

The indicator query statement may be considered as a query expression, and a statement type of the indicator query statement is determined according to the database component. For example, if the database component is a M3DB component, the statement type of the indicator query statement may be a Prometheus query language (PromQL).

Step S502: The indicator query component splits the indicator query request into M fragment query requests.

In this embodiment of this application, the indicator query component splits the indicator query request into M fragment query requests based on the indicator query information. For example, the indicator query request may be split into M fragment query requests according to a query indicator name and a query indicator attribute tag that are included in the indicator query information, where M is a positive integer.

Step S503: Determine a query database component from N database components based on the M fragment query requests, and acquire query indicator fragment data respectively corresponding to the M fragment query requests from the query database component.

In this embodiment of this application, the central cluster initiates a query to the database component based on the M fragment query requests, and the indicator query information includes a fragment query indicator name and a fragment query indicator attribute tag respectively corresponding to the M fragment query requests.

In some embodiments, the determining a query database component from N database components based on the M fragment query requests may be implemented in the following manner: acquiring fragment query hash values respectively corresponding to the M fragment query requests based on the fragment query indicator names and the fragment query indicator attribute tags respectively corresponding to the M fragment query requests; and acquiring fragment query identifiers respectively corresponding to the M fragment query hash values, and determining k query database components from the N database components based on the M fragment query identifiers; k being a positive integer less than or equal to M.

A hash algorithm corresponding to the fragment query hash value is the same as the hash algorithm corresponding to the storage hash value in FIG. 4. For example, the central cluster may acquire, based on the indicator query component, query indicator fragment data (that is, the M query indicator fragment data) respectively corresponding to M fragment query requests from the k query database components, and send the M query indicator fragment data to the indicator visualization component. Therefore, data query efficiency is improved in a fragment query manner.

Step S504: Integrate M pieces of query indicator fragment data to obtain an indicator query result, and send the indicator query result to the user equipment.

In this embodiment of this application, the central cluster may combine M pieces of query indicator fragment data based on the indicator visualization component to obtain indicator query data; establish query coordinates based on the indicator query information, and combine the query coordinates and the indicator query data to obtain an indicator query result;

where the indicator query result may be icon data or curve coordinates that include the query coordinates and the indicator query data, or may be data that includes the indicator query information and the indicator query data; and send the indicator query result to the user equipment, so that the user equipment displays the indicator query result, and the user equipment can visually display the queried indicator query result, thereby improving a query effect of the indicator data. For example, if the indicator query statement is generated by the user equipment, the user equipment may further display the indicator query result in the monitoring panel.

FIG. 4 to FIG. 5 are data processing processes according to an embodiment of this application, including a process of collecting, storing, and querying indicator data. In this embodiment of this application, the transceiver component receives the collection indicator data sent by the edge cluster; performs pre-aggregation processing on the collection indicator data based on the data push function in the transceiver component to obtain pre-aggregated indicator data, and sends the pre-aggregated indicator data to a coordinated write component; converts the pre-aggregated indicator data based on the coordinated write component into conversion indicator data that has a target storage format, and performs merging processing on the conversion indicator data to obtain storage indicator data; and writes the storage indicator data into the database component, so that the database component writes the storage indicator data into a storage disk. In the foregoing process, the transceiver component, the coordinated write component, the database component, and the like are integrated into the central cluster, and the data push function is integrated in the transceiver component, so that the transceiver component may compress the obtained data to reduce a data amount, and send the compressed data to the coordinated write component, so that data transmission can be implemented more efficiently, and data storage performance is optimized. In addition, the feature of writing the obtained storage indicator data into the database component and based on the database component improves data processing efficiency.

Figure 7:
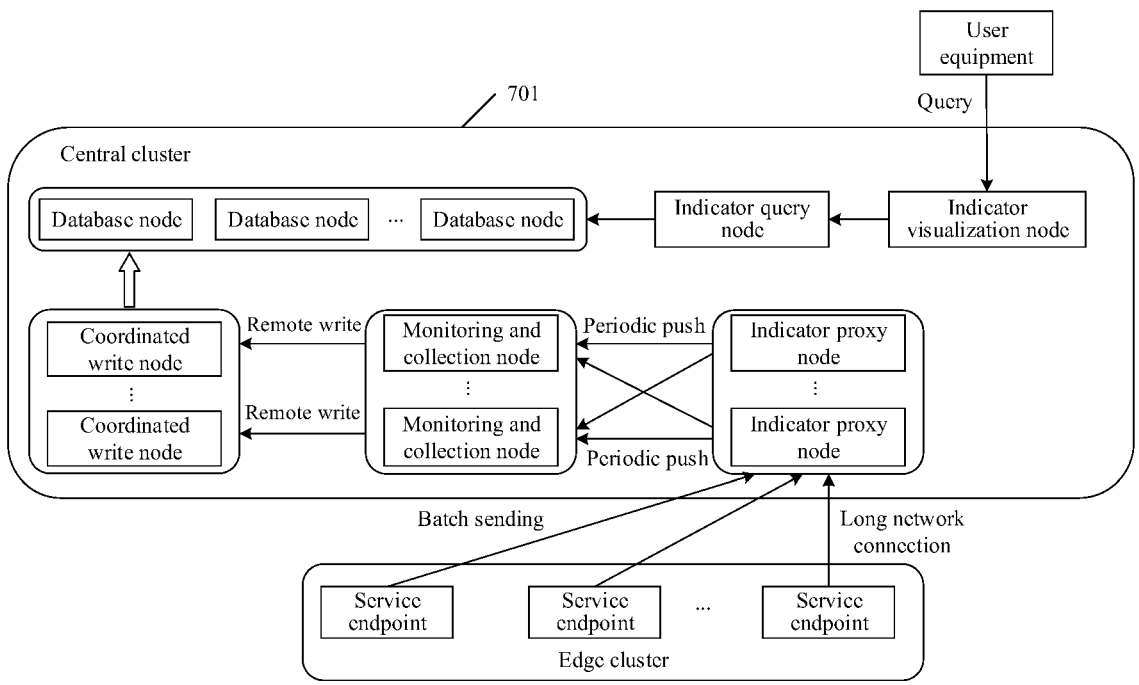
FIG. 7 is a schematic architecture diagram of a data processing system according to an embodiment of this application.

Referring to FIG. 7, FIG. 7 is a schematic architecture diagram of a data processing system according to an embodiment of this application. As shown in FIG. 7, the data processing system includes a transceiver node, a coordinated write node, and a database node. In the data processing system shown in FIG. 7, the transceiver node includes an indicator proxy node and a monitoring and collection node, and the data processing system refers to a system corresponding to a central cluster 701. Each node in the data processing system is a node formed by at least one computer device that runs the same component in the foregoing central cluster, that is, each node is implemented by using at least one computer device. In a structure of the data processing system shown in FIG. 7, costs (including time, energy, and the like) of updating the monitoring and collection node are low, and the monitoring and collection node has a relatively strong capability of supporting pre-aggregation processing, so that update efficiency and pre-aggregation efficiency of the monitoring and collection node can be improved.

The transceiver node is configured to receive collection indicator data sent by an edge cluster, and is further configured to: perform pre-aggregation processing on the collection indicator data to obtain pre-aggregated indicator data, and send the pre-aggregated indicator data to the coordinated write node; the coordinated write node is configured to: convert the pre-aggregated indicator data into conversion indicator data that has a target storage format, and perform merging processing on the conversion indicator data to obtain storage indicator data; the coordinated write node is further configured to write the storage indicator data into the database node; and the database node is configured to write the storage indicator data into a storage disk.

In some embodiments, the transceiver node includes an indicator proxy node and a monitoring and collection node. The indicator proxy node is configured to establish a long network connection to the edge cluster, and receive, by using the long network connection, the collection indicator data sent by the edge cluster; and push the collection indicator data to the monitoring and collection node. The monitoring and collection node is configured to: acquire indicator information of the collection indicator data, and acquire an indicator aggregation attribute; perform indicator conversion on collection indicator data corresponding to indicator information that matches the indicator aggregation attribute, to obtain pre-aggregated indicator data; and send a remote write request to the coordinated write node, and send the pre-aggregated indicator data to the coordinated write node based on the remote write request.

In some embodiments, the indicator proxy node is further configured to receive, by using the long network connection, to-be-processed indicator data sent by the edge cluster; acquire an indicator attribute tag of the to-be-processed indicator data, and perform merging processing on to-be-processed indicator data that has a same indicator attribute tag to obtain the collection indicator data; cache the collection indicator data into a to-be-sent indicator queue; and push the collection indicator data in the to-be-sent indicator queue to the monitoring and collection node.

In some embodiments, the transceiver node is further configured to establish a connection to a service endpoint in the edge cluster, acquire endpoint information of the service endpoint, and generate a connection random number based on the endpoint information; acquire a connection establishment range; and receive, when the connection random number is within the connection establishment range, collection indicator data sent by the service endpoint in the edge cluster.

In some embodiments, the coordinated write node is further configured to perform downsampling processing on the conversion indicator data to obtain downsampling indicator data; and acquire a conversion storage period of the conversion indicator data, and perform combination processing on downsampling indicator data that has a same conversion storage period to obtain storage indicator data.

In some embodiments, a quantity of database nodes is N, and N is a positive integer; and the coordinated write node is further configured to: acquire a storage indicator name and a storage indicator attribute tag of the storage indicator data, and generate a storage hash value of the storage indicator data based on the storage indicator name and the storage indicator attribute tag; and determine a storage fragment identifier based on the storage hash value, and write the storage indicator data into the database component corresponding to the storage fragment identifier.

In some embodiments, the database node is further configured to perform cold and hot analysis processing on the storage indicator data to obtain hot indicator data and cold indicator data that are included in the storage indicator data; and determine a hot data storage area and a cold data storage area in the storage disk, write the hot indicator data into the hot data storage area, and write the cold indicator data into the cold data storage area.

In some embodiments, the transceiver node is further configured to receive, by using the transceiver node, initial indicator data sent by the edge cluster; and acquire a to-be-collected indicator type, and generate collection indicator data based on indicator data corresponding to the to-be-collected indicator type and acquired from the initial indicator data.

For example, the edge cluster may include one or at least two service endpoints (service). The service endpoint may be considered as an edge node, and a long network connection is established between the service endpoint and the indicator proxy node. Based on the long network connection, each service endpoint may batch send collection indicator data to the indicator proxy node. The indicator proxy node creates a coordination pool/thread pool, receives collection indicator data, and may further divide collection indicator data of a large data amount into multiple small requests, and push the small requests to the monitoring and collection node in parallel. For example, the indicator proxy node receives collection indicator data, and a quantity of the collection indicator data is 1 million, divides the collection indicator data to obtain 100 small requests, where each small request includes 10000 pieces of collection indicator data, and the multiple small requests are pushed to the monitoring and collection node in parallel based on the coordination pool/thread pool. The indicator proxy node may be a metric proxy system, the monitoring and collection node may be a Prometheus system, and the Prometheus system provides a series of tool sets to monitor and query a service and an internal running status of an application.

In some embodiments, the monitoring and collection node may write pre-aggregated indicator data to the coordinated write node remotely. For example, the monitoring and collection node may perform pre-aggregation processing on the received collection indicator data to obtain multiple pieces of pre-aggregated indicator data, or may split the pre-aggregated indicator data to obtain at least two pre-aggregation push requests, and send the pre-aggregated indicator data to the coordinated write node in parallel based on the at least two pre-aggregation push requests. For example, a node parameter of the monitoring and collection node may be updated. The node parameter includes but is not limited to a data cache time and a garbage collection (GC) parameter of the monitoring and collection node. For example, the data cache time is reduced. The data cache time refers to duration in which the monitoring and collection node stores received indicator data. By reducing the data cache time, a space occupation rate of the monitoring and collection node is reduced, and running efficiency of the monitoring and collection node is improved. The GC parameter may further be adjusted. For example, if the GC parameter is set to 30, when it is detected that a memory allocated to the collection indicator data and the like for an (i+1)th time exceeds 30% of a memory allocated to the collection indicator data and the like for an ith time, a GC function is triggered to perform garbage collection, so as to release the memory of the monitoring and collection node, thereby improving running efficiency of the monitoring and collection node, and i is a positive integer.

Figure 8:
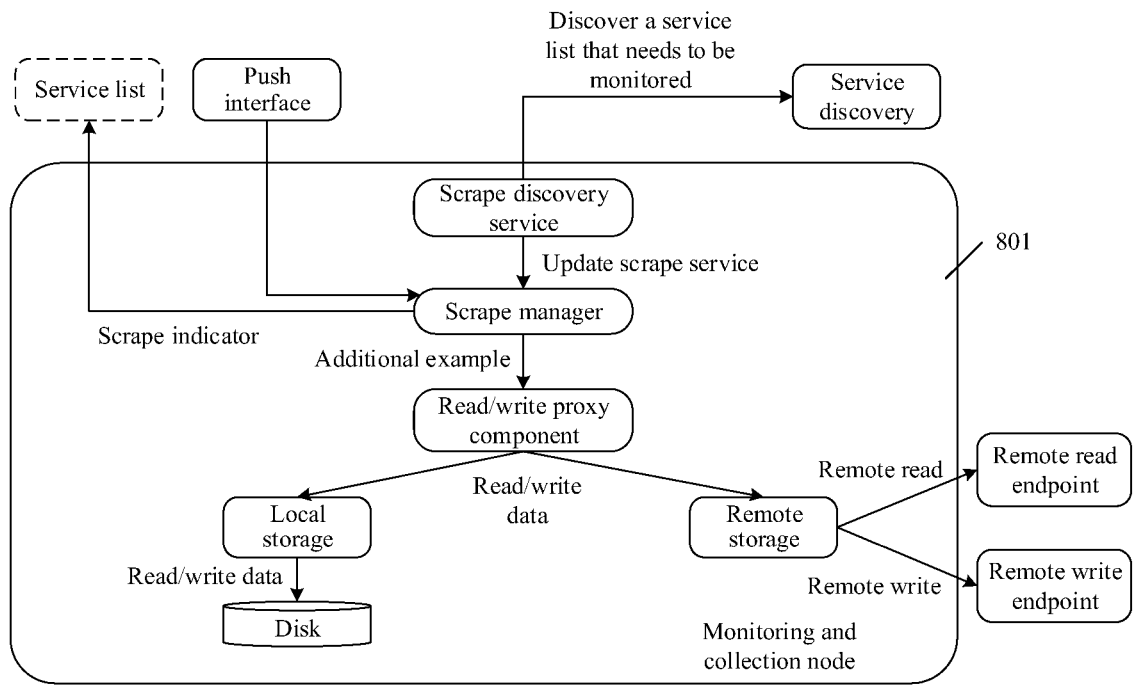
FIG. 8 is an architecture diagram of a monitoring and collection node according to an embodiment of this application.

For the Prometheus system 801, refer to FIG. 8. FIG. 8 is an architecture diagram of a monitoring and collection node according to an embodiment of this application. As shown in FIG. 8, the monitoring and collection node may monitor service discovery, discover a service (targets) list that needs to be monitored, monitor a service based on a scrape discovery function, update a scrape service based on a change of a scrape manager monitoring service, and scrape indicator data based on the service list. For example, the service list may be used for indicating a service endpoint that needs to be monitored by the monitoring and collection node, and the monitoring and collection node may filter obtained collection indicator data based on the service list.

For example, the monitoring and collection node may further include a read/write proxy component, configured to read/write data, where the monitoring and collection node may perform local storage and remote storage, local storage of the monitoring and collection node is implemented by reading/writing data from a local disk of the monitoring and collection node, and remote storage is implemented by remotely reading data from a remote read endpoint, and remotely writing data to a remote write endpoint. For example, the monitoring and collection node may store the received collection indicator data based on the read/write proxy component, or may acquire and process, based on the read/write proxy component, data stored in a local disk or a remote read endpoint.

For example, the monitoring and collection node integrates a third data push function in the scrape manager, for example, integrates a push interface in the scrape manager, implements a third data push function based on the push interface, and sends pre-aggregated indicator data obtained by processing the collection indicator data to the coordinated write node, so that the monitoring and collection node can freely control a push time and a push specification of the indicator data, that is, the monitoring and collection node can implement, based on an actual requirement, sending of the pre-aggregated indicator data to the coordinated write component at any time point, and can implement pushing of the pre-aggregated indicator data in any amount and any push manner, for example, push the pre-aggregated indicator data in a full amount (that is, the data amount is all pre-aggregated indicator data) or in a split manner (that is, the data amount is a corresponding data amount obtained after the pre-aggregated indicator data is split). The pre-aggregated indicator data may be sent to the coordinated write node in parallel (that is, the push manner is a parallel push manner), or the pre-aggregated indicator data may be sent to the coordinated write node in serial (that is, the push manner is a serial push manner), or the like.

In some embodiments, the coordinated write node may be a m3Coordinator system. The coordinated write node is configured to: convert the pre-aggregated indicator data into conversion indicator data that has a target storage format, perform merging processing on the conversion indicator data to obtain storage indicator data, write the storage indicator data into the database node, perform multi-sub-process deployment on the coordinated write node, and increase a throughput by using multiple cores. The coordinated write node may further integrate a writeWorkerPool-Policy parameter, so that the coordinated write node can increase a size of the coordination pool according to the parameter, thereby improving working performance of the coordinated write node. For example, when the coordinated write node writes the indicator data to the database node, a compression option may be added, so as to reduce an amount of data that is written by the coordinated write node to the database node, and reduce a case in which the coordinated write component hangs up (that is, a machine is stuck or down) due to an excessive amount of packets, thereby further improving performance of the coordinated write node. The database node is configured to write the storage indicator data into a storage disk.

The data processing system may further include an indicator visualization node and an indicator query node. The indicator visualization node is configured to: receive indicator query information sent by user equipment, and send an indicator query request to the indicator query node based on the indicator query information, the indicator query request including the indicator query information; the indicator query node is configured to split the indicator query request into M fragment query requests; M being a positive integer; the indicator query node is further configured to: determine a query database node from N database nodes based on the M fragment query requests, acquire query indicator fragment data respectively corresponding to the M fragment query requests from the query database node, and send the M query indicator fragment data to the indicator visualization node; and the indicator visualization node is configured to: integrate M pieces of query indicator fragment data to obtain an indicator query result, and send the indicator query result to the user equipment.

In some embodiments, the indicator visualization node is further configured to receive, based on a visualization node address of the indicator visualization node, indicator query information sent by the user equipment; acquire a query node address of the indicator query node, establish a monitoring panel based on the query node address, and acquire an indicator query statement corresponding to the indicator query information from the monitoring panel; and send an indicator query request to the indicator query node based on the indicator query statement.

In some embodiments, the indicator query information includes fragment query indicator names and fragment query indicator attribute tags respectively corresponding to the M fragment query requests; and the indicator query node is further configured to: acquire fragment query hash values respectively corresponding to the M fragment query requests based on the fragment query indicator names and the fragment query indicator attribute tags respectively corresponding to the M fragment query requests; and acquire fragment query identifiers respectively corresponding to the M fragment query hash values, and determine k query database nodes from the N database nodes based on the M fragment query identifiers, k being a positive integer less than or equal to M.

In some embodiments, the indicator visualization node is further configured to combine the M pieces of query indicator fragment data to obtain indicator query data; and establish query coordinates based on the indicator query information, and combine the query coordinates and the indicator query data to obtain an indicator query result.

Figure 9:
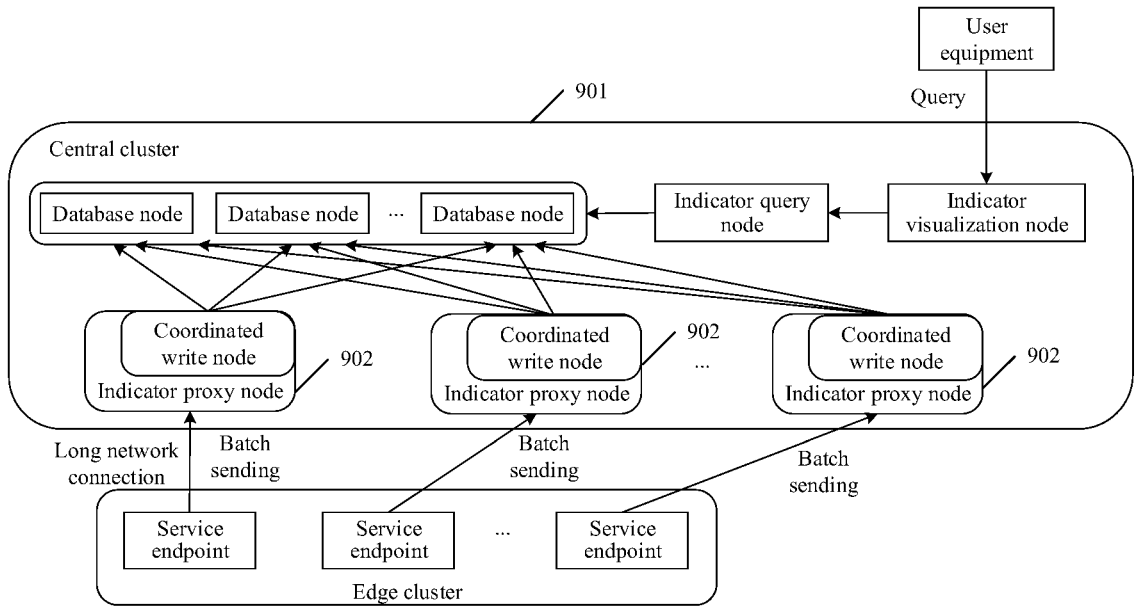
FIG. 9 is a schematic architecture diagram of another data processing system according to an embodiment of this application.

In some embodiments, referring to FIG. 9, FIG. 9 is a schematic architecture diagram of another data processing system according to an embodiment of this application. As shown in FIG. 9, the data processing system includes a transceiver node, a coordinated write node, a database node, an indicator query node, an indicator visualization node, and the like. The transceiver node includes an indicator proxy node. The data processing system is a system corresponding to a central cluster 901. Each node in the data processing system is a node formed by at least one computer device that runs the same component in the foregoing central cluster. The data processing system integrates the coordinated write node into the indicator proxy node, so as to reduce performance loss and reduce operation and maintenance costs. In the architecture of the data processing system shown in FIG. 9, the indicator proxy node acquires collection indicator data, performs pre-aggregation processing on the collection indicator data to obtain pre-aggregated indicator data, and sends the pre-aggregated indicator data to the coordinated write node, that is, a function implemented by the monitoring and collection node in FIG. 7 is implemented by the indicator proxy node 902 in the architecture shown in FIG. 9.

Figure 10:
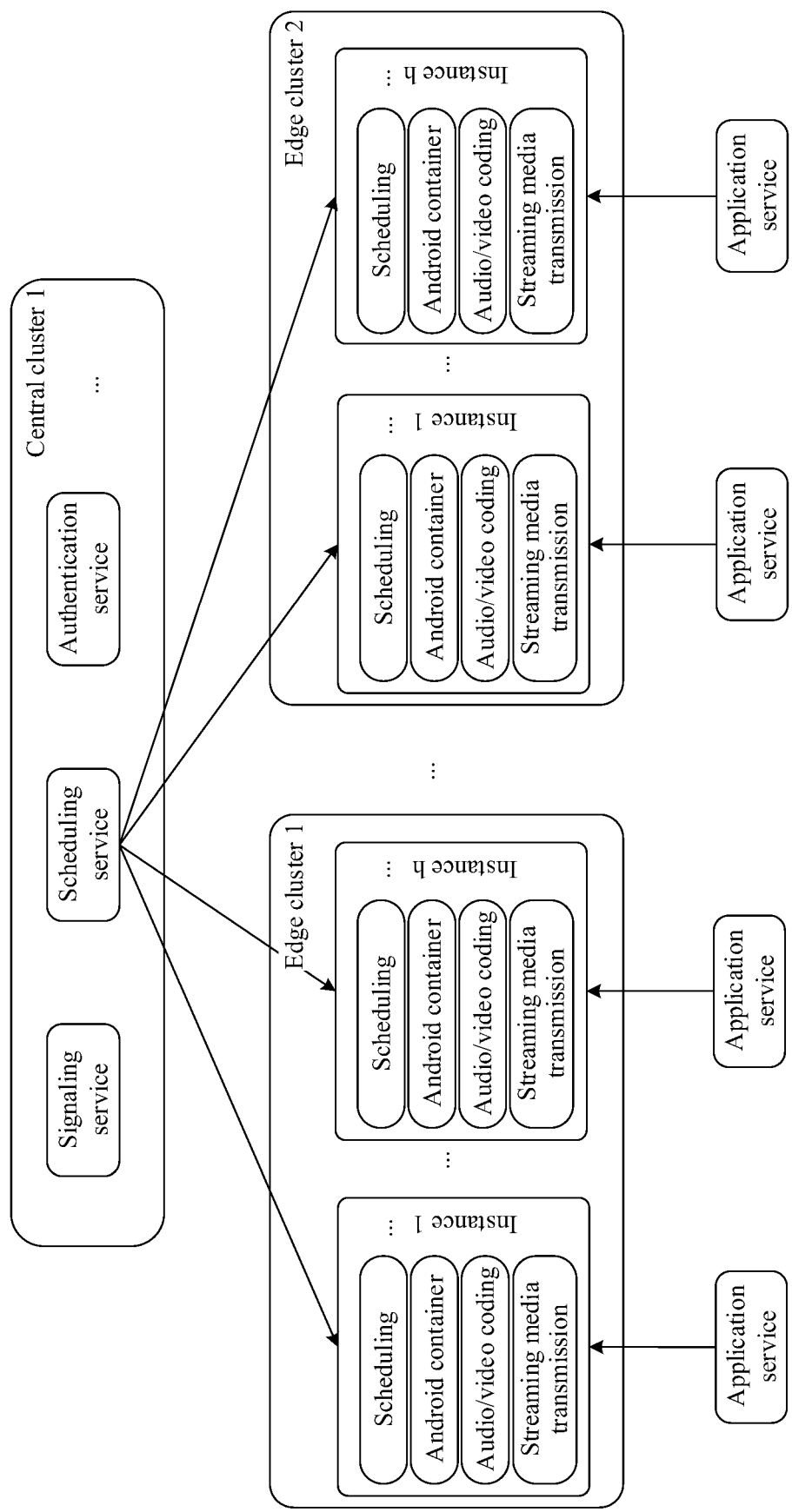
FIG. 10 is a schematic diagram of a cloud gaming deployment scenario according to an embodiment of this application.

This embodiment of this application may be applied to the cloud gaming field or a scenario in which indicator data collection is performed on any application program. For example, referring to FIG. 10, FIG. 10 is a schematic diagram of a cloud gaming deployment scenario according to an embodiment of this application. As shown in FIG. 10, there are one or at least two edge clusters (an edge cluster 1 and an edge cluster 2 shown in FIG. 10) in a cloud gaming architecture. Each edge cluster dynamically starts and destroys h instances, where h is a positive integer. The instance is served by a central cluster to perform overall scheduling, resource allocation, and the like, and each instance interacts with an application service. The application service may be an application service (App), an H5 service, a personal computer Web (PC Web) service, or the like. Each instance may include a scheduling module, an Android container module, an audio and video coding module, a streaming media transmission module, and the like. The streaming media transmission module may adjust a streaming control policy in real time according to an actual network status of a user. The central cluster may obtain, by monitoring the performance and status of the streaming media transmission module, indicator data generated by cloud gaming, that is, the indicator data generated when each user uses the cloud gaming, where the target indicator may further include a network connection indicator, a flow control policy validity indicator, an online frame freezing indicator, and the like, and the indicator data corresponding to the network connection indicator includes but is not limited to Wi-Fi, the second generation wireless communications technology (2G), the third generation mobile communications technology (3G), the fourth generation mobile communications system (4G), and the like.

According to the solution in this embodiment of this application, collection indicator data sent by an edge cluster may be acquired, and the collection indicator data is processed and stored in a database node. User equipment may obtain a miming status of the cloud gaming, the application program, and the like by querying indicator data in the database node, so as to optimize the cloud gaming, the application program, and the like.

Using the cloud gaming as an example, the central cluster may acquire collection indicator data from an edge node. The collection indicator data may include but is not limited to indicator data corresponding to indicators such as a game frame freezing frequency indicator, a game frame transmission rate indicator, a game data synchronization delay indicator, and a game rendering rate indicator. Based on the foregoing steps shown in FIG. 4, the central cluster processes the collection indicator data by using an included component, to obtain storage indicator data, and writes the storage indicator data into a database component. When the user equipment needs to obtain the indicator data related to the cloud gaming, the user equipment may send indicator query information to the central cluster. The central cluster obtains the indicator query result by performing the steps shown in FIG. 5, and sends the indicator query result to the user equipment.

The user equipment may determine a running status of the cloud gaming based on the indicator query result. If the running status of the cloud gaming indicated by the indicator query result is a game abnormal state, the user equipment may obtain abnormal indicator data from the indicator query result, and may perform optimization processing on the cloud gaming based on the abnormal indicator data, so that the cloud gaming can better meet a user requirement, and improve running efficiency and running effect of the cloud gaming. The user equipment may preset a reasonable indicator data range, compare the obtained indicator query result with the reasonable indicator data range, and when the indicator query result falls within the reasonable indicator data range, determine that the running status of the cloud gaming indicated by the indicator query result is a game normal state. When data that does not fall within the reasonable indicator data range exists in the indicator query result, it is determined that the running status of the cloud gaming indicated by the indicator query result is a game abnormal state. The reasonable indicator data range is used for indicating a range to which indicator data that needs to be available when the cloud gaming can better meet a user game requirement belongs. For example, it is assumed that a reasonable indicator data range corresponding to a game frame transmission rate indicator is less than 0.5 second/frame. When a value of the game frame transmission rate in an indicator query result is less than 0.5 second/frame, it is determined that a running status indicated by the indicator query result is a game normal state. When the value of the game frame transmission rate in the indicator query result is greater than or equal to 0.5 second/frame, it is determined that the running status of the cloud gaming indicated by the indicator query result is a game abnormal state, and the user equipment may optimize the cloud gaming, for example, update a data transmission algorithm between game devices, or compress a data packet transmitted between game devices, so as to increase the game frame transmission rate.

Figure 11:
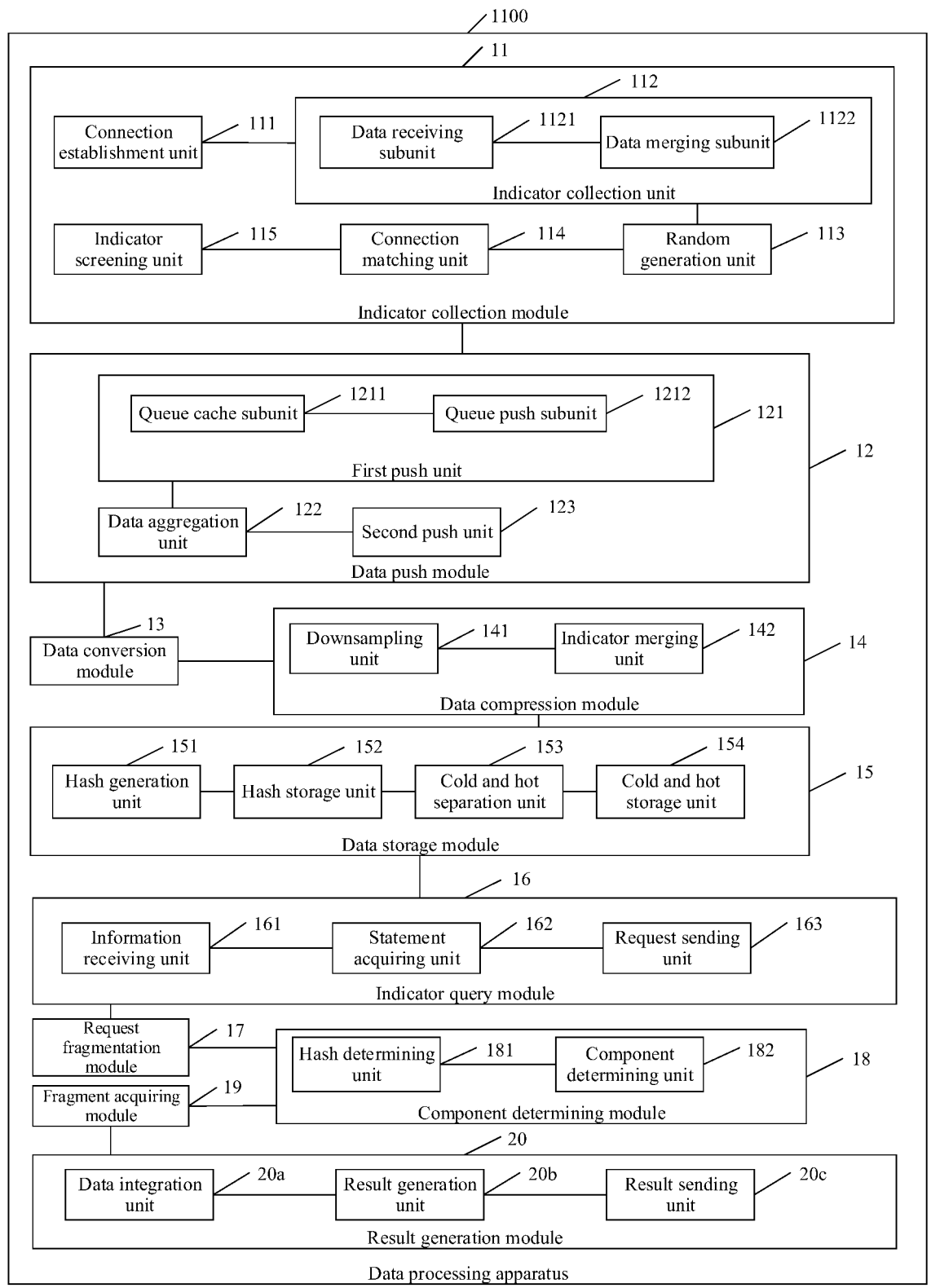
FIG. 11 is a schematic diagram of a data processing apparatus according to an embodiment of this application.

In some embodiments, referring to FIG. 11, FIG. 11 is a schematic diagram of a data processing apparatus according to an embodiment of this application. The data processing apparatus may be a computer program (including program code) running on a computer device (running the foregoing transceiver component, coordinated write component, database component, indicator query component, and indicator visualization component). For example, the data processing apparatus may be application software. The apparatus may be configured to perform corresponding steps in the method provided in the embodiment of this application. As shown in FIG. 11, the data processing apparatus 1100 may be applied to the computer device in the embodiment corresponding to FIG. 4, and the apparatus may include: an indicator collection module 11, a data push module 12, a data conversion module 13, a data compression module 14, and a data storage module 15.

The indicator collection module 11 is configured to receive, by using the transceiver component, collection indicator data sent by an edge cluster; The data push module 12 is configured to: perform pre-aggregation processing on the collection indicator data based on the transceiver component to obtain pre-aggregated indicator data, and send the pre-aggregated indicator data to the coordinated write component; the data conversion module 13 is configured to convert, based on the coordinated write component, the pre-aggregated indicator data into conversion indicator data that has a target storage format; the data compression module 14 is configured to perform merging processing on the conversion indicator data to obtain storage indicator data; and the data storage module 15 is configured to write the storage indicator data into the database component, so that the database component writes the storage indicator data into a storage disk.

In some embodiments, the transceiver component includes an indicator proxy component and a monitoring and collection component; the indicator collection module 11 includes: a connection establishment unit 111, configured to establish a long network connection to the edge cluster by using the indicator proxy component included in the transceiver component; and an indicator collection unit 112, configured to receive, by using the long network connection, collection indicator data sent by the edge cluster. The data push module 12 includes: a first push unit 121, configured to push the collection indicator data to the monitoring and collection component based on the indicator proxy component; a data aggregation unit 122, configured to: acquire, based on the monitoring and collection component, indicator information of the collection indicator data, and acquire an indicator aggregation attribute; and perform indicator conversion on collection indicator data corresponding to indicator information that matches the indicator aggregation attribute, to obtain pre-aggregated indicator data; and a second push unit 123, configured to send a remote write request to the coordinated write component based on the monitoring and collection component, and send the pre-aggregated indicator data to the coordinated write component based on the remote write request.

In some embodiments, the indicator collection unit 112 includes: a data receiving subunit 1121, configured to receive, by using the long network connection, to-be-processed indicator data sent by the edge cluster; and a data merging subunit 1122, configured to: acquire an indicator attribute tag of the to-be-processed indicator data based on the indicator proxy component, and perform merging processing on to-be-processed indicator data that has a same indicator attribute tag, to obtain the collection indicator data. The first push unit 121 includes: a queue cache subunit 1211, configured to cache the collection indicator data into a to-be-sent indicator queue based on the indicator proxy component; and a queue push subunit 1212, configured to push the collection indicator data in the to-be-sent indicator queue to the monitoring and collection component.

In some embodiments, the indicator collection module 11 includes: a random generation unit 113, configured to: establish a connection to a service endpoint in the edge cluster by using the transceiver component, acquire endpoint information of the service endpoint, and generate a connection random number based on the endpoint information; and a connection matching unit 114, configured to acquire a connection establishment range; and receive, when the connection random number is within the connection establishment range, collection indicator data sent by the service endpoint in the edge cluster. In some embodiments, the data compression module 14 includes: a downsampling unit 141, configured to perform downsampling processing on the conversion indicator data to obtain downsampling indicator data; and an indicator merging unit 142, configured to: acquire a conversion storage period of the conversion indicator data, and perform combination processing on downsampling indicator data that has a same conversion storage period to obtain storage indicator data.

In some embodiments, a quantity of database components is N, and N is a positive integer; and the data storage module 15 includes: a hash generation unit 151, configured to: acquire a storage indicator name and a storage indicator attribute tag of the storage indicator data, and generate a storage hash value of the storage indicator data based on the storage indicator name and the storage indicator attribute tag; and a hash storage unit 152, configured to: determine a storage fragment identifier based on the storage hash value, and write the storage indicator data into the database component corresponding to the storage fragment identifier.

In some embodiments, the data storage module 15 includes: a cold and hot separation unit 153, configured to perform, by the database component, cold and hot analysis processing on the storage indicator data to obtain hot indicator data and cold indicator data that are included in the storage indicator data; and a cold and hot storage unit 154, configured to: determine a hot data storage area and a cold data storage area in the storage disk, write the hot indicator data into the hot data storage area, and write the cold indicator data into the cold data storage area.

In some embodiments, the indicator collection module 11 includes: an indicator screening unit 115, configured to receive, by using the transceiver component, initial indicator data sent by the edge cluster; and acquire a to-be-collected indicator type, and generate collection indicator data based on indicator data corresponding to the to-be-collected indicator type and acquired from the initial indicator data.

In some embodiments, a quantity of database components is N, and N is a positive integer; and the apparatus further includes: an indicator query module 16, configured to: receive, by the central cluster, indicator query information sent by user equipment, and send an indicator query request to the indicator query component based on the indicator query information, the indicator query request including the indicator query information; a request fragmentation module 17, configured to split the indicator query request into M fragment query requests based on the indicator query component, M being a positive integer; a component determining module 18, configured to determine a query database component from N database components based on the M fragment query requests; a fragment acquiring module 19, configured to acquire query indicator fragment data respectively corresponding to the M fragment query requests from the query database component; and a result generation module 20, configured to: integrate M pieces of query indicator fragment data to obtain an indicator query result, and send the indicator query result to the user equipment.

In some embodiments, the indicator query module 16 includes: an information receiving unit 161, configured to receive, based on a visualization component address of the indicator visualization component, indicator query information sent by the user equipment; a statement acquiring unit 162, configured to: acquire a query component address of the indicator query component, establish a monitoring panel based on the query component address, and acquire an indicator query statement corresponding to the indicator query information from the monitoring panel; and a request sending unit 163, configured to send an indicator query request to the indicator query component based on the indicator query statement.

In some embodiments, the indicator query information includes fragment query indicator names and fragment query indicator attribute tags respectively corresponding to the M fragment query requests; and the component determining module 18 includes: a hash determining unit 181, configured to: acquire fragment query hash values respectively corresponding to the M fragment query requests based on the fragment query indicator names and the fragment query indicator attribute tags respectively corresponding to the M fragment query requests; and a component determining unit 182, configured to: acquire fragment query identifiers respectively corresponding to the M fragment query hash values, and determine k query database components from the N database components based on the M fragment query identifiers, k being a positive integer less than or equal to M.

In some embodiments, the result generation module 20 includes: a data integration unit 20a, configured to combine the M pieces of query indicator fragment data to obtain indicator query data; a result generation unit 20b, configured to: establish query coordinates based on the indicator query information, and combine the query coordinates and the indicator query data to obtain an indicator query result; and a result sending unit 20c, configured to send the indicator query result to the user equipment, so that the user equipment displays the indicator query result.

An embodiment of this application provides a data processing apparatus. The apparatus may run in a central cluster. In the central cluster, a transceiver component, a coordinated write component, a database component, and the like are integrated. The transceiver component compresses obtained data, so as to reduce a data amount, and sends the compressed data to the coordinated write component, so that data transmission can be more efficiently implemented, and performance is optimized. In addition, obtained storage indicator data is written into the database component, so that storage is extensible and data processing efficiency is improved based on an extensible feature of the database component.

Figure 12:
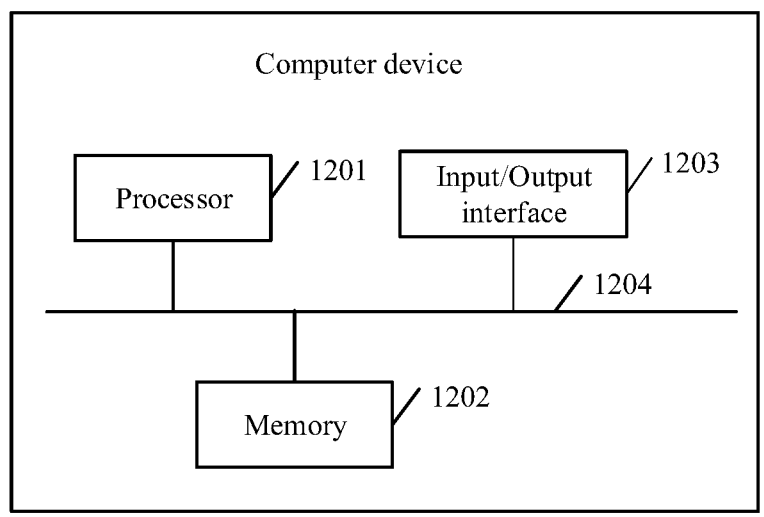
FIG. 12 is a schematic structural diagram of a computer device according to an embodiment of this application.

Referring to FIG. 12, FIG. 12 is a schematic structural diagram of a computer device (running the foregoing transceiver component, coordinated write component, database component, indicator query component, and indicator visualization component) according to an embodiment of this application. As shown in FIG. 12, the computer device in this embodiment of this application may include: one or more processors 1201, a memory 1202, and an input/output interface 1203. The processor 1201, the memory 1202, and the input/output interface 1203 are connected by using a bus 1204. The memory 1202 is configured to store a computer program. The computer program includes program instructions. The input/output interface 1203 is configured to receive data and output data, for example, is configured to perform data interaction between a central cluster and an edge cluster, or is configured to perform data interaction between a central cluster and user equipment, or is configured to perform data interaction between components in a central cluster. The processor 1201 is configured to execute the program instructions stored in the memory 1202.

The processor 1201 may perform the following operations:

receiving, by using the transceiver component, collection indicator data sent by an edge cluster; performing pre-aggregation processing on the collection indicator data based on the transceiver component to obtain pre-aggregated indicator data, and sending the pre-aggregated indicator data to the coordinated write component; converting, by the coordinated write component, the pre-aggregated indicator data into conversion indicator data that has a target storage format, and performing merging processing on the conversion indicator data to obtain storage indicator data; writing the storage indicator data into a database component; and writing, by the database component, the storage indicator data into a storage disk.

In some feasible implementations, the processor 1201 may be a central processing unit (CPU), and the processor may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor.

The memory 1202 may include a read-only memory and a random access memory, and provides an instruction and data for the processor 1201 and the input/output interface 1203. A part of the memory 1202 may further include a non-volatile random access memory. For example, the memory 1202 may further store information about a device type.

In specific implementation, the computer device may execute, by using each built-in function module of the computer device, the implementation provided in the steps in FIG. 4. Refer to the implementation provided in the steps in FIG. 4, and details are not described herein again.

An embodiment of this application provides a computer device, including: a processor, an input/output interface, and a memory. The processor acquires a computer program in the memory, performs steps of the method shown in FIG. 4, and performs a data processing operation. In a central cluster, a transceiver component, a coordinated write component, a database component, and the like are integrated. The transceiver component may compress obtained data, so as to reduce a data amount, and send the compressed data to the coordinated write component, so that data transmission can be more efficiently implemented, and performance is optimized. In addition, obtained storage indicator data is written into the database component, so that storage is extensible and data processing efficiency is improved based on an extensible feature of the database component.

An embodiment of this application further provides a computer readable storage medium. The computer readable storage medium stores a computer program. The computer program is suitable for a processor to load and execute the data processing method provided in the steps in FIG. 4. References may be made to the implementation provided in the steps in FIG. 4, and details are not described herein again. In addition, the description of beneficial effects of the same method is not described herein again. For technical details that are not disclosed in the computer readable storage medium embodiments in the embodiments of this application, refer to the descriptions of the embodiments of this application. As an example, the computer program may be deployed to be executed on one computer device, or executed on multiple computer devices located at one location, or executed on multiple computer devices distributed at multiple locations and interconnected by using a communication network.

The foregoing computer readable storage medium may be the data processing apparatus provided in any one of the foregoing embodiments or an internal storage unit of the foregoing computer device, such as a hard disk or a memory of the computer device. The computer readable storage medium may also be an external storage device of the computer device, for example, a plug type hard disk, a smart media card (SMC), a secure digital (SD) card, and a flash card that are configured on the computer device. In some embodiments, the computer readable storage medium may further include an internal storage unit of the computer device and an external storage device. The computer readable storage medium is configured to store the computer program and other programs and data required by the computer device. The computer readable storage medium may be further configured to temporarily store data that has been or is to be output.

An embodiment of this application provides a computer program product or a computer program. The computer program product or the computer program includes computer instructions, and the computer instructions are stored in a computer readable storage medium. A processor of a computer device reads the computer instructions from the computer readable storage medium. The processor executes the computer instructions, so that the computer device executes the method provided in the various manners in FIG. 4, and implements integration of a transceiver component, a coordinated write component, a database component, and the like in a central cluster. The transceiver component may compress obtained data, so as to reduce a data amount, and send the compressed data to the coordinated write component, so that data transmission can be more efficiently implemented, and performance is optimized. In addition, obtained storage indicator data is written into the database component, so that storage is extensible and data processing efficiency is improved based on an extensible feature of the database component.

The terms "first" and "second" in the specification, claims, and accompanying drawings of the embodiments of this application are used for distinguishing between different objects, and are not used for describing a specific sequence. In addition, the term "include" and any variant thereof are intended to cover a non-exclusive inclusion. For example, a process, method, apparatus, product, or device that includes a series of steps or units is not limited to the listed steps or modules; and instead, further includes a step or module that is not listed, or further includes another step or unit that is intrinsic to the process, method, apparatus, product, or device.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are executed in a mode of hardware or software depends on particular applications and design constraint conditions of the technical solutions. Those skilled in the art may use different methods to implement the described functions for each particular application, but such implementation is not to be considered beyond the scope of this application.

The method and the related apparatus provided in the embodiments of this application are described with reference to a flowchart and/or a schematic structural diagram of the method provided in the embodiments of this application. Each process and/or block of the method flowchart and/or the schematic structural diagram of the method may be implemented by a computer program instruction, and a combination of the process and/or block in the flowchart and/or block diagram. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the schematic structural diagram. These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the schematic structural diagram. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagram.

The steps of the method in the embodiments of this application may be adjusted in terms of sequence, and merged or deleted according to an actual requirement.

The modules in the apparatus in the embodiment of this application may be combined, divided, or deleted according to an actual requirement.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A data processing method performed by a computer network acting as a central cluster, the central cluster comprising multiple computer devices, the central cluster is communicatively connected to multiple edge clusters that are configured to dynamically start and destroy instances served by the central cluster, and each computer device being configured to run at least one of a transceiver component, a coordinated write component, and a database component, the transceiver component including an indicator proxy node; and the method comprising:
    establishing, by the indicator proxy node, a persistent network connection to an edge cluster of the multiple edge clusters and maintaining, by the indicator proxy node, the persistent connection with the edge cluster via heartbeat packets;
    receiving, by the transceiver component via the persistent network, collection indicator data sent by the edge cluster;
    performing pre-aggregation processing on the collection indicator data to obtain pre-aggregated indicator data, including:
        acquiring indicator information of the collection indicator data, wherein the collection indicator data includes round trip time (RTT) data and the indicator information includes an indicator attribute tag for the RTT data, and acquiring an indicator aggregation attribute;
        performing indicator conversion on at least a subset of the collection indicator data that includes the round trip time (RTT) data whose indicator attribute tag matches the indicator aggregation attribute, to obtain the pre-aggregated indicator data, wherein the pre-aggregated indicator data has a size smaller than that of the subset of the collection indicator data; and
        sending the pre-aggregated indicator data to the coordinated write component;
    converting, by the coordinated write component, the pre-aggregated indicator data into conversion indicator data that has a target storage format supported by the database component;

performing, by the coordinated write component, merging processing on the conversion indicator data to obtain storage indicator data; and writing, by the database component, the storage indicator data into a storage disk.

2. The method according to claim 1, wherein the receiving, by using the transceiver component, collection indicator data sent by an edge cluster comprises:

establishing a connection to a service endpoint in the edge cluster by using the transceiver component, acquiring endpoint information of the service endpoint, and generating a connection random number based on the endpoint information;

acquiring a connection establishment range; and receiving, when the connection random number is within the connection establishment range, collection indicator data sent by the service endpoint in the edge cluster.

3. The method according to claim 1, wherein the performing merging processing on the conversion indicator data to obtain storage indicator data comprises:

performing downsampling processing on the conversion indicator data to obtain downsampling indicator data; and acquiring a conversion storage period of the conversion indicator data, and performing combination processing on downsampling indicator data that has a same conversion storage period to obtain storage indicator data.

4. The method according to claim 1, wherein the writing, by the database component, the storage indicator data into a storage disk comprises:

acquiring a storage indicator name and a storage indicator attribute tag of the storage indicator data, and generating a storage hash value of the storage indicator data based on the storage indicator name and the storage indicator attribute tag; and determining a storage fragment identifier based on the storage hash value, and writing the storage indicator data into the database component corresponding to the storage fragment identifier.

5. The method according to claim 1, wherein the writing, by the database component, the storage indicator data into a storage disk comprises:

performing, by the database component, cold and hot analysis processing on the storage indicator data to obtain hot indicator data and cold indicator data that are comprised in the storage indicator data; and determining a hot data storage area and a cold data storage area in the storage disk, writing the hot indicator data into the hot data storage area, and writing the cold indicator data into the cold data storage area.

6. The method according to claim 1, wherein the receiving, by using the transceiver component, collection indicator data sent by an edge cluster comprises:

receiving, by using the transceiver component, initial indicator data sent by the edge cluster; and acquiring a to-be-collected indicator type, and generating collection indicator data based on indicator data corresponding to the to-be-collected indicator type and acquired from the initial indicator data.

7. The method according to claim 1, wherein the computer device is further configured to run an indicator query component, and the method further comprises:

receiving, by the central cluster, indicator query information sent by user equipment, and sending an indicator query request to the indicator query component based on the indicator query information, the indicator query request comprising the indicator query information;

splitting, by the indicator query component, the indicator query request into M fragment query requests, M being a positive integer;

determining a query database component based on the M fragment query requests, and acquiring query indicator fragment data respectively corresponding to the M fragment query requests from the query database component; and integrating M pieces of query indicator fragment data to obtain an indicator query result, and sending the indicator query result to the user equipment.

8. A computer network acting as a central cluster, the central cluster comprising multiple computer devices, the central cluster is communicatively connected to multiple edge clusters that are configured to dynamically start and destroy instances served by the central cluster, each computer device comprising a processor, a memory, and a computer program being configured to run at least one of a transceiver component that includes an indicator proxy node, a coordinated write component, and a database component and collectively causing the central cluster to perform a data processing method including:

establishing, by the indicator proxy node, a persistent network connection to an edge cluster of the multiple edge clusters and maintaining, by the indicator proxy node, the persistent connection with the edge cluster via heartbeat packets;

receiving, by the transceiver component via the persistent network, collection indicator data sent by the edge cluster;

performing pre-aggregation processing on the collection indicator data to obtain pre-aggregated indicator data, including:

acquiring indicator information of the collection indicator data, wherein the collection indicator data includes round trip time (RTT) data and the indicator information includes an indicator attribute tag for the RTT data, and acquiring an indicator aggregation attribute;

performing indicator conversion on at least a subset of the collection indicator data that includes the round trip time (RTT) data whose indicator attribute tag matches the indicator aggregation attribute, to obtain the pre-aggregated indicator data, wherein the pre-aggregated indicator data has a size smaller than that of the subset of the collection indicator data; and sending the pre-aggregated indicator data to the coordinated write component;

converting, by the coordinated write component, the pre-aggregated indicator data into conversion indicator data that has a target storage format, and performing merging processing on the conversion indicator data to obtain storage indicator data; and writing, by the database component, the storage indicator data into a storage disk.

9. The computer network according to claim 8, wherein the receiving, by using the transceiver component, collection indicator data sent by an edge cluster comprises:

establishing a connection to a service endpoint in the edge cluster by using the transceiver component, acquiring endpoint information of the service endpoint, and generating a connection random number based on the endpoint information;

acquiring a connection establishment range; and receiving, when the connection random number is within the connection establishment range, collection indicator data sent by the service endpoint in the edge cluster.

10. The computer network according to claim 8, wherein the performing merging processing on the conversion indicator data to obtain storage indicator data comprises:
  performing downsampling processing on the conversion indicator data to obtain downsampling indicator data; and
  acquiring a conversion storage period of the conversion indicator data, and performing combination processing on downsampling indicator data that has a same conversion storage period to obtain storage indicator data.

11. The computer network according to claim 8, wherein the writing, by the database component, the storage indicator data into a storage disk comprises:
  acquiring a storage indicator name and a storage indicator attribute tag of the storage indicator data, and generating a storage hash value of the storage indicator data based on the storage indicator name and the storage indicator attribute tag; and
  determining a storage fragment identifier based on the storage hash value, and writing the storage indicator data into the database component corresponding to the storage fragment identifier.

12. The computer network according to claim 8, wherein the writing, by the database component, the storage indicator data into a storage disk comprises:
  performing, by the database component, cold and hot analysis processing on the storage indicator data to obtain hot indicator data and cold indicator data that are comprised in the storage indicator data; and
  determining a hot data storage area and a cold data storage area in the storage disk, writing the hot indicator data into the hot data storage area, and writing the cold indicator data into the cold data storage area.

13. The computer network according to claim 8, wherein the receiving, by using the transceiver component, collection indicator data sent by an edge cluster comprises:
  receiving, by using the transceiver component, initial indicator data sent by the edge cluster; and
  acquiring a to-be-collected indicator type, and generating collection indicator data based on indicator data corresponding to the to-be-collected indicator type and acquired from the initial indicator data.

14. The computer network according to claim 8, wherein the computer device is further configured to run an indicator query component, and the method further comprises:
  receiving, by the central cluster, indicator query information sent by user equipment, and sending an indicator query request to the indicator query component based on the indicator query information, the indicator query request comprising the indicator query information;
  splitting, by the indicator query component, the indicator query request into M fragment query requests, M being a positive integer;
  determining a query database component based on the M fragment query requests, and acquiring query indicator fragment data respectively corresponding to the M fragment query requests from the query database component; and
  integrating M pieces of query indicator fragment data to obtain an indicator query result, and sending the indicator query result to the user equipment.

15. A non-transitory computer readable storage medium, storing a plurality of computer programs being configured to run, respectively, a transceiver component that includes an indicator proxy node, a coordinated write component, and a database component, and each computer program being loaded and executed by a processor of a respective one of a plurality of computer devices constituting a computer network acting as a central cluster communicatively connected to multiple edge clusters that are configured to dynamically start and destroy instances served by the central cluster, causing the central cluster to perform a data processing method including:
  establishing, by the indicator proxy node, a persistent network connection to an edge cluster of the multiple edge clusters and maintaining, by the indicator proxy node, the persistent connection with the edge cluster via heartbeat packets;
  receiving, by the transceiver component via the persistent network, collection indicator data sent by the edge cluster;
  performing pre-aggregation processing on the collection indicator data to obtain pre-aggregated indicator data, including:
    acquiring indicator information of the collection indicator data, wherein the collection indicator data includes round trip time (RTT) data and the indicator information includes an indicator attribute tag for the RTT data, and acquiring an indicator aggregation attribute;
    performing indicator conversion on at least a subset of the collection indicator data that includes the round trip time (RTT) data whose indicator attribute tag matches the indicator aggregation attribute, to obtain the pre-aggregated indicator data, wherein the pre-aggregated indicator data has a size smaller than that of the subset of the collection indicator data; and
    sending the pre-aggregated indicator data to the coordinated write component;
  converting, by the coordinated write component, the pre-aggregated indicator data into conversion indicator data that has a target storage format, and performing merging processing on the conversion indicator data to obtain storage indicator data; and
  writing, by the database component, the storage indicator data into a storage disk.

16. The non-transitory computer readable storage medium according to claim 15, wherein the receiving, by using the transceiver component, collection indicator data sent by an edge cluster comprises:
  establishing a connection to a service endpoint in the edge cluster by using the transceiver component, acquiring endpoint information of the service endpoint, and generating a connection random number based on the endpoint information;
  acquiring a connection establishment range; and
  receiving, when the connection random number is within the connection establishment range, collection indicator data sent by the service endpoint in the edge cluster.

17. The non-transitory computer readable storage medium according to claim 15, wherein the performing merging processing on the conversion indicator data to obtain storage indicator data comprises:
  performing downsampling processing on the conversion indicator data to obtain downsampling indicator data; and
  acquiring a conversion storage period of the conversion indicator data, and performing combination processing on downsampling indicator data that has a same conversion storage period to obtain storage indicator data.

18. The non-transitory computer readable storage medium according to claim 15, wherein the writing, by the database component, the storage indicator data into a storage disk comprises:

performing, by the database component, cold and hot analysis processing on the storage indicator data to obtain hot indicator data and cold indicator data that are comprised in the storage indicator data; and determining a hot data storage area and a cold data storage area in the storage disk, writing the hot indicator data into the hot data storage area, and writing the cold indicator data into the cold data storage area.

19. The non-transitory computer readable storage medium according to claim 15, wherein the receiving, by using the transceiver component, collection indicator data sent by an edge cluster comprises:

receiving, by using the transceiver component, initial indicator data sent by the edge cluster; and acquiring a to-be-collected indicator type, and generating collection indicator data based on indicator data corresponding to the to-be-collected indicator type and acquired from the initial indicator data.

20. The non-transitory computer readable storage medium according to claim 15, wherein the computer device is further configured to run an indicator query component, and the method further comprises:

receiving, by the central cluster, indicator query information sent by user equipment, and sending an indicator query request to the indicator query component based on the indicator query information, the indicator query request comprising the indicator query information;

splitting, by the indicator query component, the indicator query request into M fragment query requests, M being a positive integer;

determining a query database component based on the M fragment query requests, and acquiring query indicator fragment data respectively corresponding to the M fragment query requests from the query database component; and integrating M pieces of query indicator fragment data to obtain an indicator query result, and sending the indicator query result to the user equipment.

* * * * *